(12) United States Patent
Naohara

(10) Patent No.: US 8,363,520 B2
(45) Date of Patent: Jan. 29, 2013

(54) INFORMATION PROCESSING APPARATUS, CONTROL METHOD FOR CONTROLLING INFORMATION PROCESSING APPARATUS, CONTROL PROGRAM OF INFORMATION PROCESSING APPARATUS, AND STORAGE MEDIUM STORING CONTROL PROGRAM OF INFORMATION PROCESSING APPARATUS THEREIN

(75) Inventor: Hiroaki Naohara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 12/922,988

(22) PCT Filed: Mar. 12, 2009

(86) PCT No.: PCT/JP2009/054717
§ 371 (c)(1),
(2), (4) Date: Sep. 16, 2010

(87) PCT Pub. No.: WO2009/116443
PCT Pub. Date: Sep. 24, 2009

(65) Prior Publication Data
US 2011/0019526 A1 Jan. 27, 2011

(30) Foreign Application Priority Data
Mar. 21, 2008 (JP) .................. 2008-074062

(51) Int. Cl.
*G11B 20/10* (2006.01)
(52) U.S. Cl. ............. 369/47.14; 369/53.17; 369/53.35; 369/94; 369/275.3
(58) Field of Classification Search .............. 369/47.14, 369/53.17, 53.35, 94
See application file for complete search history.

(56) References Cited

U.S. PATENT DOCUMENTS

| | | | |
|---|---|---|---|
| 6,205,099 B1 * | 3/2001 | Sasaki et al. | 369/53.17 |
| 7,000,152 B1 * | 2/2006 | Lin | 714/42 |
| 2003/0137909 A1 * | 7/2003 | Ito et al. | 369/47.14 |
| 2007/0053251 A1 | 3/2007 | Blacquiere et al. | |
| 2008/0219123 A1 * | 9/2008 | Basile et al. | 369/84 |
| 2009/0285063 A1 | 11/2009 | Blacquiere et al. | |

FOREIGN PATENT DOCUMENTS

| | | |
|---|---|---|
| JP | 4-349273 A | 12/1992 |
| JP | 2006-500713 A | 1/2006 |
| JP | 2007-026600 A | 2/2007 |

OTHER PUBLICATIONS

Osabe, Hisao et al., Feb. 1, 2007, Japanese Patent Publication JP2007026600A.*

* cited by examiner

*Primary Examiner* — Wayne Young
*Assistant Examiner* — Brenda Bernardi
(74) *Attorney, Agent, or Firm* — Birch, Stewart, Kolasch & Birch, LLP

(57) ABSTRACT

An optical disk apparatus according to the present invention includes: a sub-data forming section for forming, from data to be recorded into an optical disk (3), element data (42a, 42b) constituting the data and parity data (42c) for reconstructing the data in a case where the element data (42a, 42b) becomes unreadable; and a recording position determining section for determining respective recording positions for the element data (42a, 42b) and the parity data (42c). The recording position determining section determines the respective recording positions for the element data (42a, 42b) and the parity data (42c) such that they do not overlap each other in a projection plane of the optical disk viewed in a light-irradiation direction. The arrangement makes it possible to improve reliability of data reconstruction in a case where data loss occurs in data recorded in the optical disk (3) in which data is recordable in a plurality of layers.

19 Claims, 22 Drawing Sheets

FIG. 16

| 3 | 2 | 1 | |
|---|---|---|---|
| 1 | 0 | 0 | Error Found In Third Sub Data |
| 0 | 1 | 0 | Error Found In Second Sub Data |
| 0 | 0 | 1 | Error Found In First Sub Data |

FIG. 22
| Sub Data | Writing Start Position |
|---|---|
| First Sub Data | First Recording Layer Track 0, Sector 0 |
| Second Sub Data | Second Recording Layer Track 0, Sector 0 |
| Third Sub Data | Third Recording Layer Track 0, Sector 0 |
FIG. 23  CONVENTIONAL ART
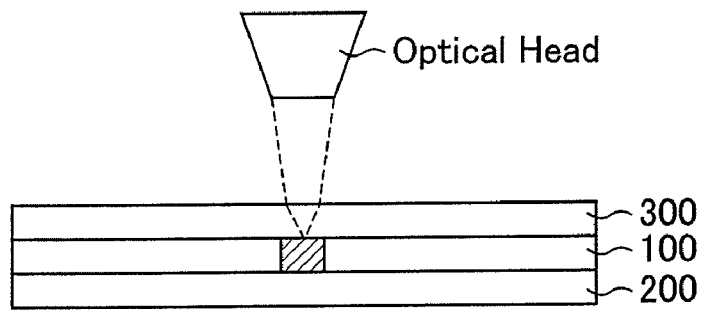
FIG. 24  CONVENTIONAL ART
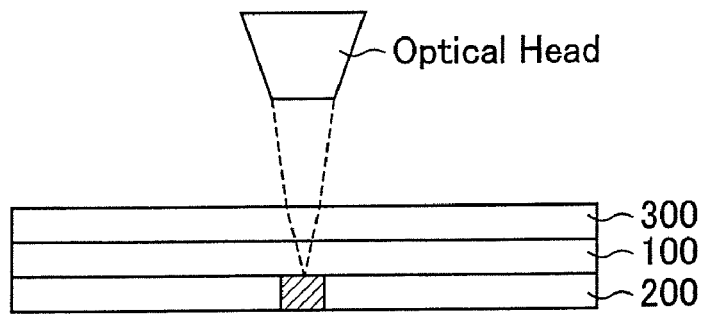

①,③ : Area Which Is Not Affected
②   : Area Which Is Affected

INFORMATION PROCESSING APPARATUS, CONTROL METHOD FOR CONTROLLING INFORMATION PROCESSING APPARATUS, CONTROL PROGRAM OF INFORMATION PROCESSING APPARATUS, AND STORAGE MEDIUM STORING CONTROL PROGRAM OF INFORMATION PROCESSING APPARATUS THEREIN

TECHNICAL FIELD

The present invention relates to an information processing apparatus for recording data by irradiating light to an optical disk having a plurality of recording layers in which to store data, a control method for controlling the information processing apparatus, a control program of the information processing apparatus, and a storage medium in which the control program of the information processing apparatus is stored.

BACKGROUND ART

In a case where an error such as noise contamination happens when data is read via communications over a network or from a memory medium, it is detected from a redundant code preliminarily added to the data whether or not any error occurs. If there is an error, error correction is conventionally carried out so as to reproduce original data. However, in cases where a given data amount includes many errors, the data cannot be reconstructed properly. For example, there are some cases where a recording device, such as a hard disk or an optical disk apparatus, cannot carry out the error correction with respect to a storage medium because the storage medium is damaged due to an impact or the like. Especially, in a case where the storage medium is an optical disk, a recording surface thereof is touchable by hand directly. The direct touch to the recording surface may possibly cause so big a damage on the storage medium that the error correction cannot be performed on the storage medium. Further, in some cases, the optical disk itself deteriorates so much due to direct or indirect sunlight that the error correction cannot be performed on the storage medium.

There is a well-known technique for preventing such data deterioration or data loss. The technique is called RAID (Redundant Arrays of Inexpensive Disks). The RAID is a technique in which (i) original data to be recorded is split into a plurality of pieces of sub data, and (ii) the plurality of pieces of sub data are recorded into a plurality of hard disks, respectively, in a distributed manner. At the time when the pieces of sub data are recorded into to the respective plurality of hard disks in a distributed manner, parity information is added to the pieces of sub data. With this arrangement, even if reading of data from any of the plurality of hard disks is failed, it is still possible to reconstruct the original data properly based on the other piece(s) of data read from the other hard disk(s).

Other than the technique for recording data into a plurality of hard disks in a distributed manner, there is disclosed another technique in which a single hard disk is arranged in the following manner so as to a realize mirroring function (Patent Literature 1). More specifically, the technique disclosed in Patent Literature 1 is so arranged that data recording is carried out such that data is written into 2 portions in a data storage medium, and data reading is carried out such that the data is read from either one of the 2 portions. With the arrangement, even if either one of the pieces of data causes an error, the other one of the pieces of data can be read.

Further, as still another technique, there is disclosed an information processing apparatus for performing data recording on a single optical disk including a plurality of recording layers in such a manner that data and its backup data for reconstructing the data are recorded into respective recording layers among the plurality of recording layers or individually recorded into the same layer (Patent Literature 2). The information processing apparatus arranged as such can achieve an improvement in efficiency of recording data and its backup data.

However, with the conventional arrangement, it is difficult to increase reliability of reconstruction of lost data in the optical disk in which data has been recorded into the plurality of recording layers.

More specifically, the optical disk in which data is recorded into a plurality of layers is arranged such that in a case where respective pieces of data are read from or recorded into different recording layers (for example, a recording layer 100 and a recording layer 200), light emitted from an optical head toward the optical disk is focused on a target layer where data is to be read from or recorded in (see FIG. 23 and FIG. 24). FIG. 23 and FIG. 24 show the conventional technique, each illustrating how light from the optical head is irradiated to a recording layer (100, 200) at the time of data recording or data reading.

As illustrated in FIG. 25, when a protection layer 300 is partially scratched (damaged) such that the scratch gets in the way of the light that is irradiated to the recording layer 100 in which a target piece of data is recorded, there may arise such a problem that the piece of data cannot be read from the recording layer 100 due to the scratch. In addition, in a case where (i) another piece of data is recorded in the recording layer 200 and (ii) recording positions (where data is recorded) of the recording layers 100 and 200 overlap each other in a light-irradiation direction of the light from the optical head, there may occur such a problem that the another piece of data cannot be read from the recording layer 200, either (see FIG. 26). FIG. 25 and FIG. 26 show the conventional technique, each illustrating (i) data recorded in a recording layer (100, 200) and (ii) how light from an optical head is irradiated to the recording layer, in a case where a protection layer (300) of an optical disk is damaged.

That is, in the optical disk in which data is recordable in a plurality of layers, there are some cases where not only data recorded in a given recording area of the recording layer 100 but also data recorded in a given recording area of the recording layer 200 may become unreadable due to the scratch on the protection layer 300 (see FIG. 27). On this account, in a case where data and its reconstruction data for reconstructing the data are recorded in the recording layer 100 and the recording layer 200, respectively, in a distributed manner, both the data and the reconstruction data may become unreadable due to a single scratch on the protection layer 300, in some cases. Here, FIG. 27 illustrates a relationship between (i) how light from an optical head is irradiated, (ii) the scratch on the protection layer 300, and (iii) ranges in the recording layers 100 and 200 in which the scratch affects data writing and data reading.

Patent Literature 1 described above does not improve the reliability of reconstruction of lost data in the optical disk in which data is recordable in a plurality of layers. Further, Patent Literature 2 does not prevent the problem that both of the data and the reconstruction data become unreadable due to the single scratch on the protection layer 300.

CITATION LIST

Patent Literature 1
Japanese Patent Application Publication, Tokukaihei, No. 4-349273 (Publication Date: Dec. 3, 1992)
Patent Literature 2
Japanese Patent Application Publication, Tokukai, No. 2007-26600 (Publication Date: Feb. 1, 2007)

SUMMARY OF INVENTION

The present invention is accomplished in view of the above problems. An object of the present invention is to realize an information processing apparatus that can improve reliability of data reconstruction in a case where loss of recorded data occurs in an optical disk in which data is recordable in a plurality of layers, a control method for controlling the information processing apparatus, a control program of the information processing apparatus, and a storage medium in which the control program of the information processing apparatus is stored.

An information processing apparatus according to the present invention is an information processing apparatus for recording data into an optical disk including a plurality of recording layers in which to record data, by irradiating light thereto. In order to achieve the above object, the said information processing apparatus includes: forming means for forming, from a single piece of data to be recorded, element data constituting the single piece of data and reconstruction data for reconstructing the single piece of data in a case where the element data becomes unreadable; and recording position determining means for determining respective recording positions for the element data and the reconstruction data, which are formed by the forming means from the single piece of data, so that the element data and the reconstruction data are recorded at the respective recording positions in different recording layers, and the recording position determining means determines the respective recording positions for the element data and the reconstruction data such that the respective recording positions do not overlap each other in a projection plane of the optical disk viewed in a light-irradiation direction in which the irradiated light travels.

With the above arrangement, the forming means can form element data constituting a piece of data to be recorded and reconstruction data for reconstructing the piece of data. As a result, even in a case where the element data becomes unreadable, it is possible to reconstruct the piece of data recorded in the optical disk, by use of the reconstruction data.

Further, the information processing apparatus of the present invention includes the recording position determining means so that the element data and the reconstruction data, which are formed from the same data, can be recorded in different recording layers at respective recording positions that do not overlap each other in a projection plane of the optical disk. Accordingly, it is possible to prevent such a problem that both of the element data and the reconstruction data recorded in the optical disk become unreadable due to a scratch formed on the optical disk because they are recorded in different recording layers at respective recording positions that overlap each other in the projection plane.

Consequently, the information processing apparatus of the present invention can yield an effect that reliability of data reconstruction can be improved in a case where data loss occurs in recorded data in an optical disk in which data is recordable in a plurality of layers.

An information processing apparatus control method according to the present invention is a control method for controlling an information processing apparatus for recording data into an optical disk including a plurality of recording layers in which to record data, by irradiating light thereto. In order to achieve the above object, the control method of the present invention includes the steps of: (i) forming, from a single piece of data to be recorded, element data constituting the single piece of data and reconstruction data for reconstructing the single piece of data in a case where the element data becomes unreadable; and (ii) determining respective recording positions for the element data and the reconstruction data, which are formed from the single piece of data in the step (i), so that the element data and the reconstruction data are recorded at the respective recording positions in different recording layers, and the step (ii) determines the respective recording positions for the element data and the reconstruction data such that the respective recording positions do not overlap each other in a projection plane of the optical disk viewed in a light-irradiation direction in which the irradiated light travels.

With the above control method, it is possible to form, from a piece of data to be recorded, element data constituting the piece of data and reconstruction data for reconstructing the piece of data in the step (i). As a result, even in a case where the element data becomes unreadable, it is possible to reconstruct the piece of data recorded in the optical disk, by use of the reconstruction data.

Further, in the step (ii), it is possible to record the element data and the reconstruction data, which are formed from the same data, into different recording layers at respective recording positions that do not overlap each other in a projection plane of the optical disk. Accordingly, it is possible to prevent such a problem that both of the element data and the reconstruction data recorded in the optical disk become unreadable due to a scratch formed on the optical disk because they are recorded in different recording layers at respective recording positions that overlap each other in the projection plane.

Consequently, the information processing apparatus control method of the present invention can yield an effect that reliability of data reconstruction can be improved in a case where data loss occurs in recorded data in an optical disk in which data is recordable in a plurality of layers.

Additional objects, features, and strengths of the present invention will be made clear by the description below. Further, the advantages of the present invention will be evident from the following explanation in reference to the drawings.

BRIEF DESCRIPTION OF DRAWINGS

FIG. 16 illustrates exemplary error information in accordance with an embodiment of the present invention.

FIG. 22 illustrates one example of writing start position information in accordance with another embodiment (Embodiment 2) of the present invention.

FIG. 23 illustrates a conventional technique, specifically illustrating how light from an optical head is irradiated to a recording layer at the time of recording data in the recording layer or reproducing data from the recording layer.

FIG. 24 illustrates a conventional technique, specifically illustrating how light from an optical head is irradiated to a recording layer at the time of recording data in the recording layer or reproducing data from the recording layer.

DESCRIPTION OF EMBODIMENTS

Embodiment 1

The following describes one embodiment of the present invention with reference to FIG. 1 through FIG. 19. An optical disk apparatus (information processing apparatus) 1 in accordance with the present embodiment is connected to a personal computer 2 so that they can communicate to each other. The optical disk apparatus 1 records data 40 into an optical disk 3 or reads data 40 from the optical disk 3, in response to an instruction from the personal computer 2. The personal computer 2 is an apparatus for reproducing the data 40 recorded in the optical disk 3 and for holding the data 40 to be recorded.

Figure 2:
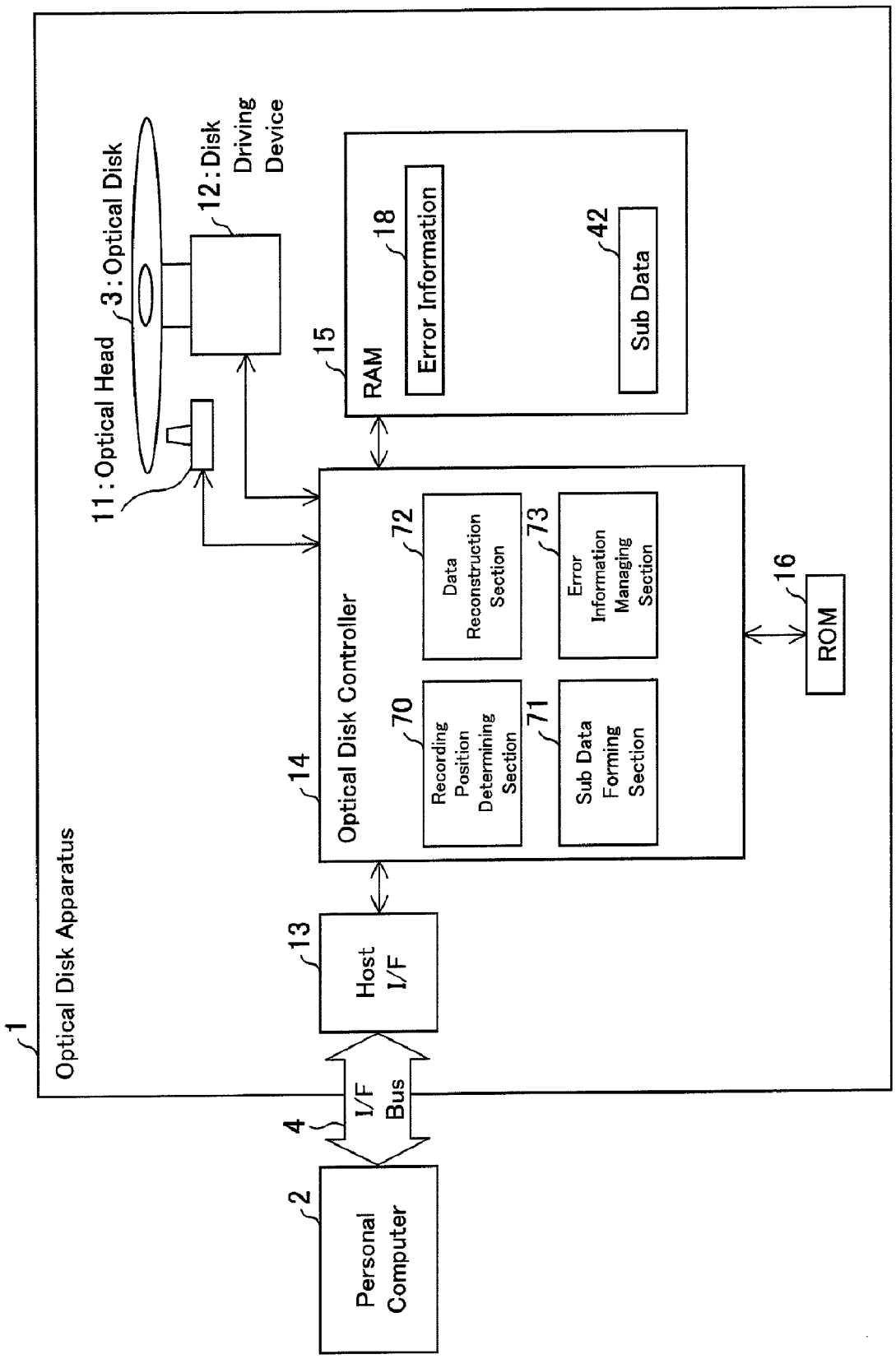
FIG. 2 is a block diagram illustrating an arrangement of essential parts of an optical disk apparatus in accordance with an embodiment of the present invention.

As illustrated in FIG. 2, the optical disk apparatus 1 includes an optical head 11, a disk driving device 12, a host I/F 13, an optical disk controller (recording position determining means, forming means) 14, RAM 15, and ROM 16. FIG. 2 is a block diagram illustrating an arrangement of essential parts of the optical disk apparatus 1 in accordance with the embodiment of the present invention.

The optical head 11 irradiates light onto a recording surface 30 of an optical disk 3 in response to a control instruction from the optical disk controller 14, so as to read the data 40 recorded from the optical disk 3 or record the data 40 into the optical disk 3. The optical head 11 then sends the data 40 thus read from the optical disk 3 to the optical disk controller 14. The optical head 11 will be described later more specifically.

The disk driving device 12 rotates the optical disk 3, which is a storage medium, in response to an instruction from the optical disk controller 14. The disk driving device 12 rotates the optical disk 3 so that the data 40 can be recorded at an intended position in a recording region of the optical disk 3 or the data 40 can be read from the recording region. The rotation of the optical disk 3 is executed by a spindle motor 21 included in the disk driving device 12.

The host I/F 13 serves as an interface to the personal computer 2. The optical disk apparatus 1 in accordance with the present embodiment is connected to the personal computer 2 so that they can communicate with each other. In this arrangement, the host I/F 13 receives a control instruction from the personal computer 2 via an I/F bus 4, and supplies the control instruction into the optical disk controller 14.

The optical disk controller 14 carries out various controls with respect to the respective sections of the optical disk apparatus 1. More specifically, in response to the control instruction received from the personal computer 2 via the host I/F 13, the optical disk controller 14 controls the optical head 11 and the disk driving device 12 so as to read the data 40 from the optical disk 3 or record the data into the optical disk 3. Further, the optical disk controller 14 carries out controls to store, into the RAM 15, the data 40 thus read from the optical disk 3 and to send the data 40 to the personal computer 2 via the host I/F 13.

The optical disk controller 14 includes, as functional blocks, a recording position determining section (recording position determining means) 70, a sub-data forming section (forming means) 71, a data reconstruction section 72, and an error information managing section 73 (see FIG. 2). In a case where the optical disk controller 14 is realized by a CPU that controls the optical disk apparatus 1, these functional blocks can be realized such that the CPU loads into the RAM 15 a program stored in the ROM 16 and executes the program.

Figure 3:
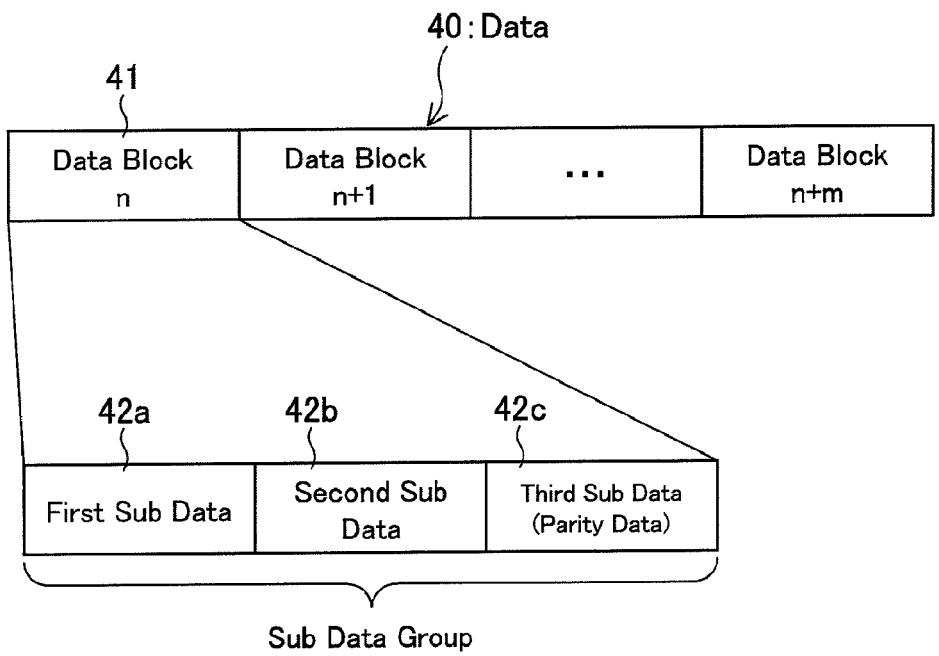
FIG. 3 illustrates a relationship between data, a data block, and sub data, in accordance with an embodiment of the present invention.

The sub-data forming section 71 receives, via the host I/F 13, data blocks (data) 41 into which the data is divided by the personal computer 2, and forms per data block 41 a given number of pieces of sub data 42 including pieces of element data constituting the data block 41, and parity data (reconstruction data) used for reconstructing the data block 41 (see FIG. 3). In the optical disk apparatus 1 in accordance with the present embodiment, with the use of the parity data, it is possible to reconstruct the data block 41 based on pieces of readable element data, in a case where one of the pieces of element data becomes unreadable. Note that, in the present embodiment, among the pieces of sub data 42, first sub data 42a and second sub data 42b are element data, and third sub data 42c is parity data (reconstruction data).

Figure 4:
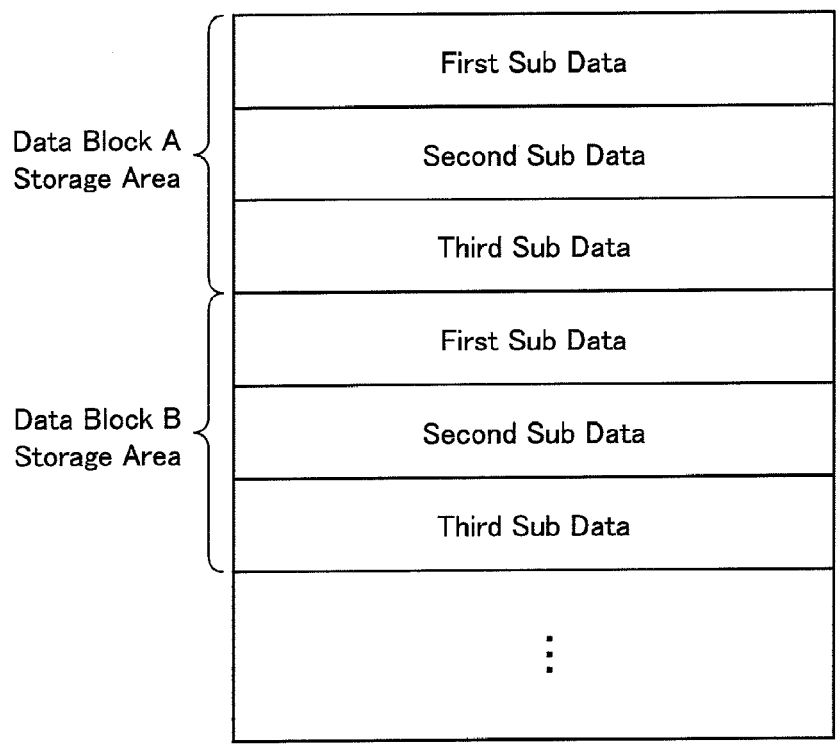
FIG. 4 illustrates one example of sub-data recording positions in RAM, in accordance with an embodiment of the present invention.

Then, the sub-data forming section 71 stores these pieces of sub data 42 (the first sub data 42a, the second sub data 42b, and the third sub data 42c) into a corresponding data block storage area, which is managed in the RAM 15 per data block 41 (see FIG. 4). FIG. 4 illustrates one example of recording positions of the pieces of sub-data 42 in the RAM 15, in accordance with the present embodiment of the present invention. Hereinafter, in a case where it is not necessary to explain the first sub data 42a, the second sub data 42b, and the third sub data 42c individually, these pieces of sub data 42a to 42c are collectively referred to just as (pieces of) sub data 42.

The recording position determining section 70 executes a process of calculating writing positions for the respective pieces of sub data 42 to be recorded in the optical disk 3, or a process of calculating reading positions of the respective pieces of sub data 42 recorded in the optical disk 3. The optical disk controller 14 records each of the first sub data 42a, the second sub data 42b, and the third sub data 42c into a physical sector of a corresponding recording layer determined by the recording position determining section 70. The recording position determining section 70 determines a recording position based on a data block number accompanying a reading request or a writing request sent from the personal computer 2.

Upon receiving, from the personal computer 2, instruction information for requesting a reading process of reading a target data block 41, the data reconstruction section 72 determines a reading position of the target data block 41, i.e., respective positions at which pieces of sub data 42 of the target data block 41 are written, and then reads out the pieces of sub data 42 from the respective positions. The data reconstruction section 72 reconstructs the target data block 41 from the pieces of sub data 42 thus read out, and supplies the target data block 41 to the host I/F 13 so that the target data block 41 is sent to the personal computer 2 via the I/F bus 4.

The error information managing section 73 makes a record of sub data 42 that cannot be read properly (a reading result is "error") in the data reading process, and manages the record.

In the meantime, in a case of writing the pieces of sub data 42 of the data block 41 into the optical disk 3, the optical disk controller 14 reads out from the RAM 15 the first sub data 42a, the second sub data 42b, and the third sub data 42c, and then controls the optical head 11 to record these pieces of sub data 42a to 42c in the optical disk 3 in a distributed manner.

As described above, in the ROM 16, there is stored program for realizing the functional blocks. Further, in the ROM 16, there is stored setting information on recording of the data block 41 in the optical disk 3 and reading of the data block 41 from the optical disk 3. The optical disk controller 14 reads out the setting information and carries out initial settings such as positioning of the optical head 11, positioning of a focus of light irradiated from the optical head 11, and setting of light intensity. Further, in the ROM 16, there is also stored information for determining a rotational speed and the like of the optical disk 3 so that recording (writing) or reading of the data block 41 is appropriately carried out with respect to the optical disk 3 depending on performance of the optical head 11. Based on the information, the optical disk controller 14 controls the disk driving device 12.

(Arrangement of Optical Head)

Figure 5:
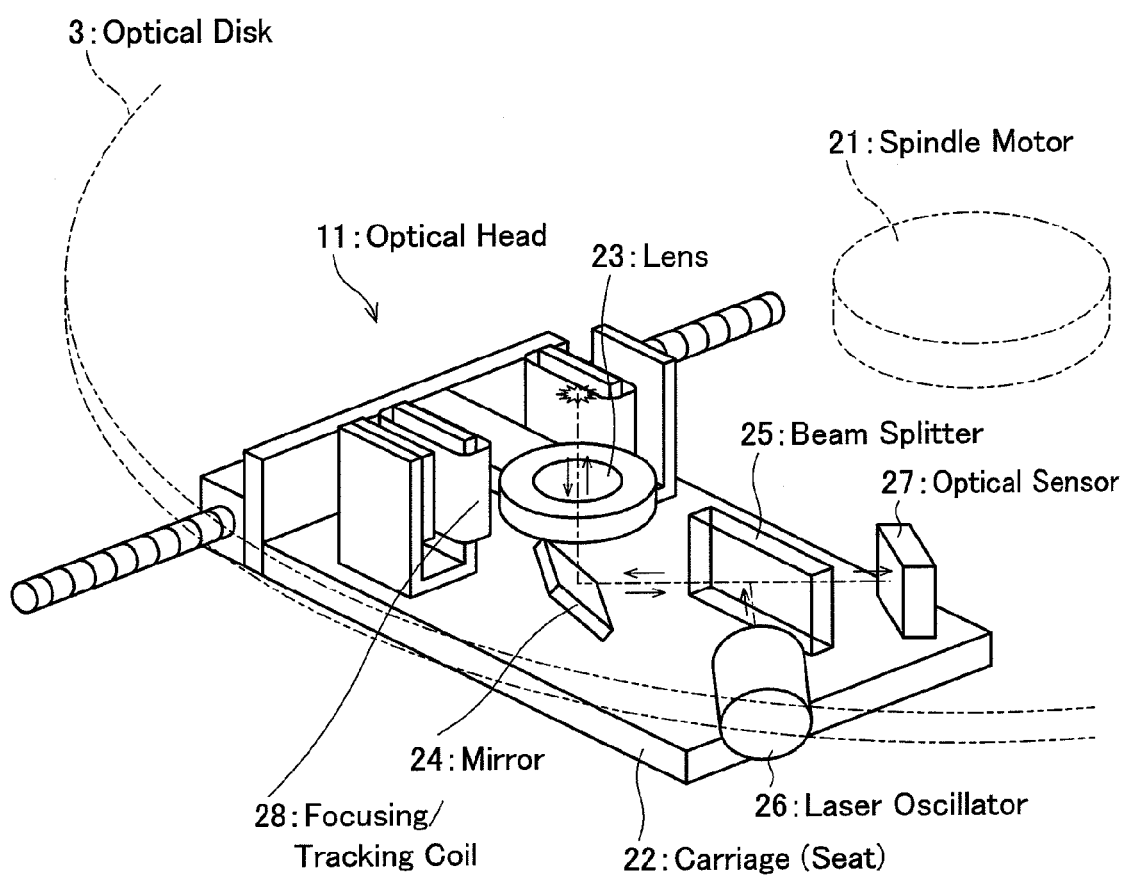
FIG. 5 is a perspective view illustrating an arrangement of an optical head in accordance with an embodiment of the present invention.

The optical head 11 in accordance with the present embodiment includes a carriage 22, a lens 23, a mirror 24, a beam splitter 25, a laser oscillator 26, an optical sensor 27, and a focusing/tracking coil 28 (see FIG. 5). The members from the lens 23 to the focusing/tracking coil 28 are provided on the carriage 22. FIG. 5 is a perspective view illustrating an arrangement of the optical head 11 in accordance with the present embodiment of the present invention.

For example, in a case where the sub data 42 is recorded in the optical disk 3, the optical head 11 causes the laser oscillator 26 to output light in response to a control instruction from the optical disk controller 14. The light thus outputted is then guided into the lens 23 via the beam splitter 25 and the mirror 24. From the lens 23, the light is irradiated toward the optical disk 3. The light thus irradiated is focused on a recording layer of the optical disk 3 by the lens 23, and optically changes a layer material of the recording layer by heat. Thus, the sub data 42 is recorded in the optical disk 3.

On the other hand, in a case where the sub data 42 is read from the optical disk 3, light having lower intensity than that of the light irradiated in the recording of the sub data 42 is focused on the recording layer in which data to be read is recorded. Reflection light reflecting off the recording layer passes through the lens 23 and is guided into the optical sensor 27 via the mirror 24 and the beam splitter 25. Upon receiving the reflection light, the optical sensor 27 converts the reflection light into an electric signal and sends the electric signal to the optical disk controller 14.

The optical disk apparatus 1 includes the focusing/tracking coil 28 so as to perform what is called focusing that maintains the light irradiated to the optical disk 3 to be focused on a recording layer, and to perform what is called tracking that controls the light to be irradiated to a light-receiving position properly so that the light thus irradiated follows a track on the optical disk 3 accurately.

(Arrangement of Optical Disk)

Figure 6:
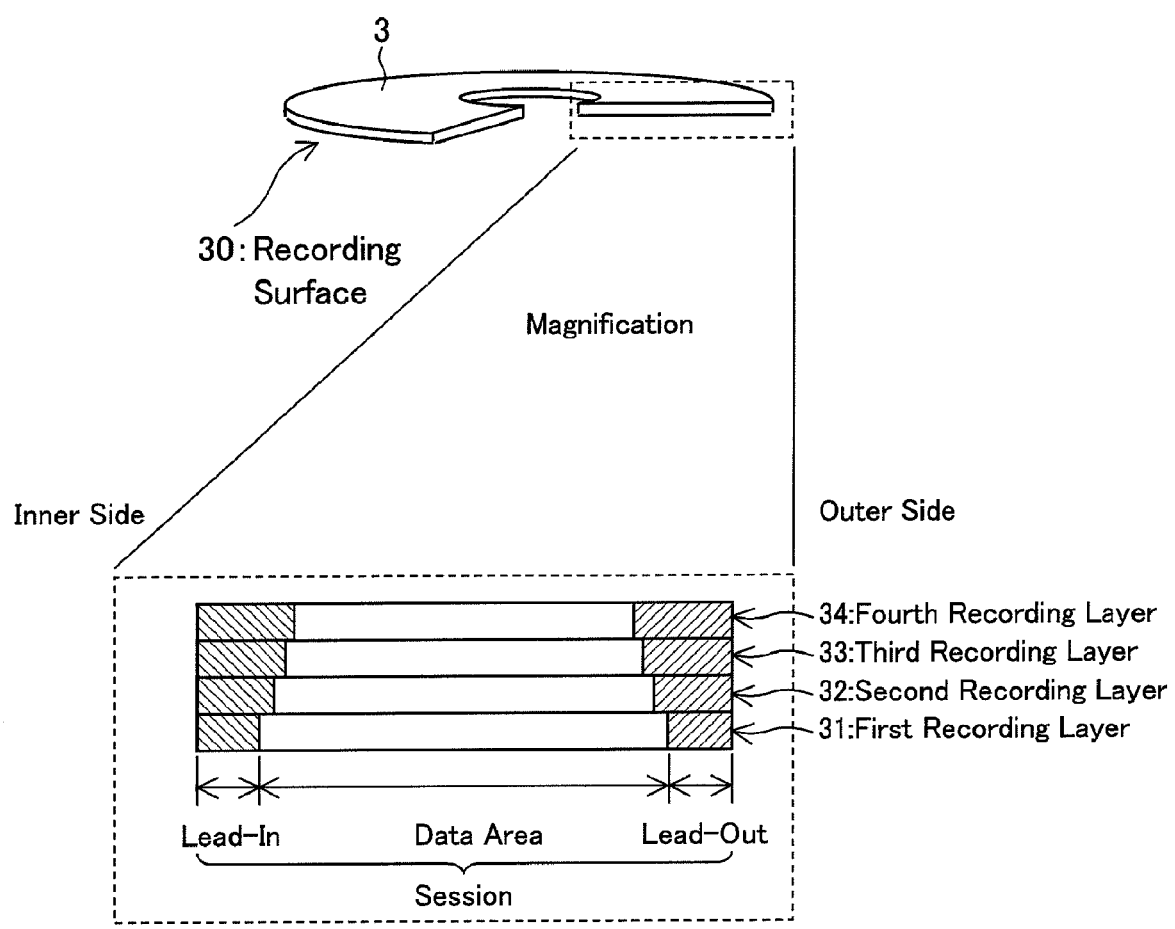
FIG. 6 illustrates one example of a cross section structure of an optical disk in accordance with an embodiment of the present invention.

The following describes an optical disk 3 in accordance with the present embodiment, with reference to FIG. 6. FIG. 6 illustrates one example of a cross section structure of the optical disk 3 in accordance with the present embodiment of the present invention. As illustrated in FIG. 6, the optical disk 3 in accordance with the present embodiment has a discoid shape. In a cross section of the optical disk 3, which is cut out in vertical directions to a recording surface 30 on which the sub data 42 is recorded, the optical disk 3 is provided with 4 recording layers of a first recording layer 31, a second recording layer 32, a third recording layer 33, and a fourth recording layer 34.

When an "inner side" is a central side of the discoid shape and an "outer side" is an outer circumference of the discoid shape, a lead-in area and a lead-out area are respectively provided at an end portion of the "inner side" and an end portion of the "outer side" in a data recording area of the optical disk 3 in such a manner that the lead-in area and the lead-out area sandwich a data area in which to record the sub data 42. A set of the lead-in area, the data area, and the lead-out area is regarded as one session, and the sub data 42 is recordable per session.

The lead-in area is an area in which management information provided at a headmost part of the session is managed. The management information is information necessary for access to the data area, such as information on tracks. The lead-out area is an area indicative of an end of the session.

The optical disk 3 in accordance with the present embodiment is arranged such that each recording layer has 1 session. However, the optical disk 3 may be arranged such that a single recording layer has a plurality of session. Further, the optical disk 3 illustrated in FIG. 6 is constituted by 4 recording layers, for convenience of explanation. However, the optical disk 3 may be constituted by 2 or 3 recording layers, or 4 or more recording layers.

In FIG. 6, lead-in and lead-out areas provided in the first recording layer are respectively smaller than lead-in and lead-out areas provided in the second recording layer. That is, the lead-in and lead-out areas become larger in the order from the first recording layer to the fourth recording layer. In other words, the recording layer positioned farther from the recording surface 30 has a larger lead-in area and a larger lead-out area. However, it is not necessary to change the size of these areas per recording layer, and all the recording layers may be provided with the same-sized lead-in areas and the same-sized lead-out areas.

(Sub-Data Recording Position)

As described above, in the optical disk apparatus 1 of the present embodiment, the sub-data forming section 71 divides each data block 41 into a plurality of pieces of sub data 42 including parity information used for reconstructing the data block 41. In the optical disk apparatus 1, the recording position determining section 70 determines respective recording positions for the pieces of sub data 42 so that the pieces of sub data 42 are recorded in different recording layers in a distributed manner. At this time, the recording position determining section 70 determines the respective recording positions for the pieces of sub data 42 so that they are sufficiently distanced from each other. This can prevent that plural pieces of sub data 42 among the pieces of sub data 42, formed from the same data block 41, become unreadable due to a scratch formed on the optical disk 3.

With reference to FIG. 1 and FIG. 7 through FIG. 11, the following describes a positional relationship between the respective recording positions for the pieces of sub data 42, which recording positions are determined by the recording position determining section 70. For convenience of explanation, it is assumed that each of the recording layers has one session and a given number of tracks (for example, 100 tracks) formed thereon. Further, it is assumed that a direction in which light emitted from the optical head 11 travels toward the recording surface 30 is regarded as a light-irradiation direction. In this case, the same-numbered tracks of the respective recording layers are placed at the same position (i.e., they overlap each other) in a projection plane viewed in the light-irradiation direction. Further, the same-numbered sectors assigned on the respective recording layers are place at the same position (i.e., they overlap each other) in the projection plane. That is, the data recording position on the recording layer is managed based on track and sector, and addresses are assigned to tracks and sectors of each of the recording layers in such a manner that tracks or sectors having an identical address correspond to each other between the recording layers.

Figure 1:
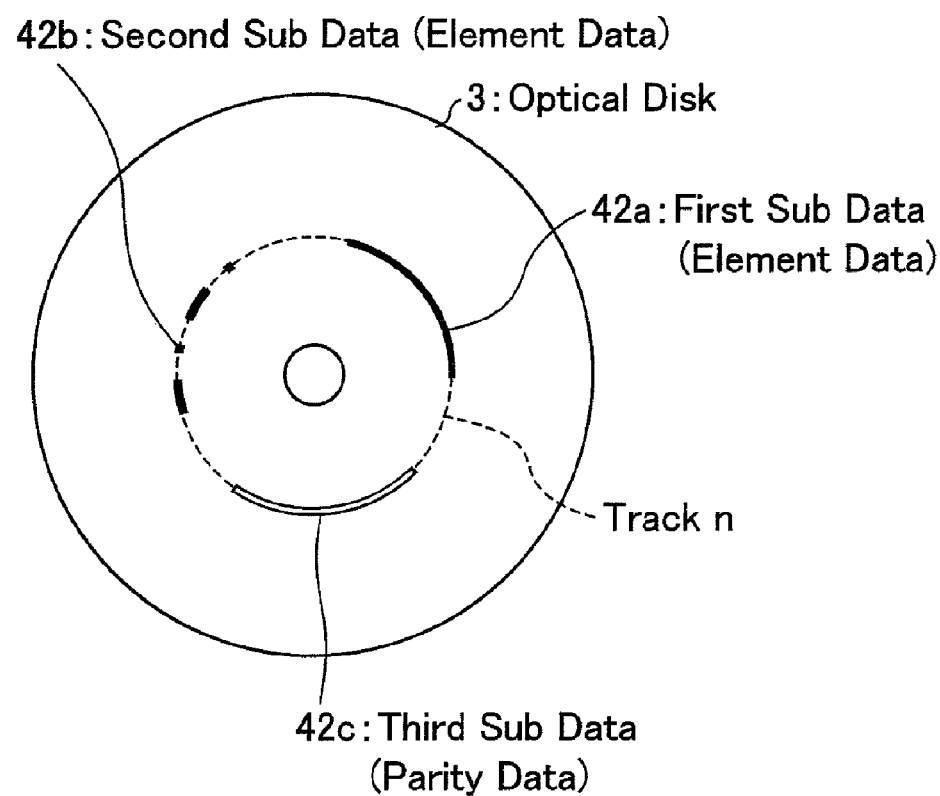
FIG. 1 illustrates one example of sub-data recording positions in a projection plane of an optical disk viewed in a light-irradiation direction, in accordance with an embodiment of the present invention.
Figure 7:
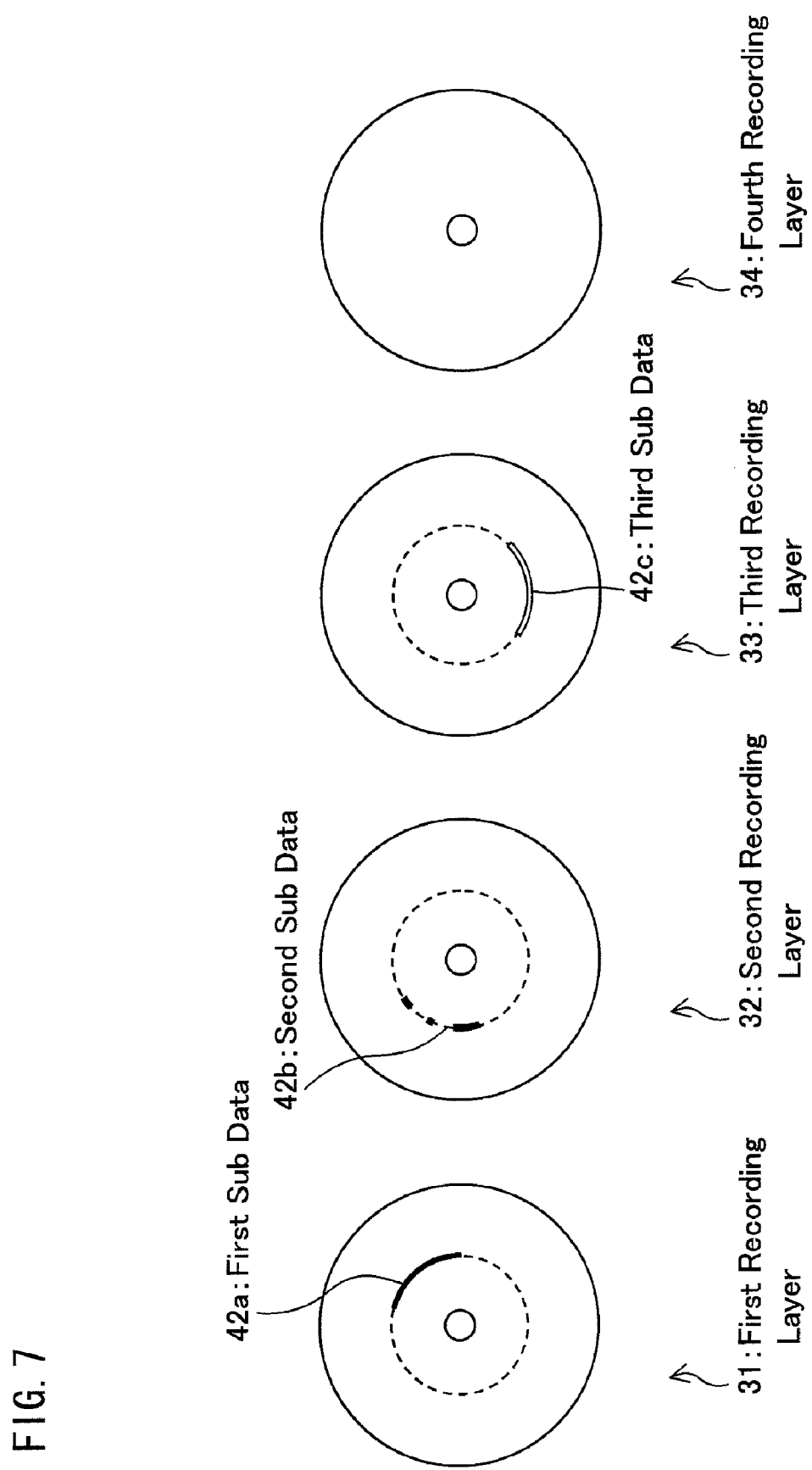
FIG. 7 illustrates an embodiment of the present invention, separately illustrating recording layers to show where each of the sub-data recording positions of FIG. 1 are located on a corresponding recording layer.

Further, that the respective recording positions for the pieces of sub data 42 sufficiently distanced from each other means that the respective recording positions for the pieces of sub data 42 are sufficiently distanced from each other in a projection plane of the optical disk 3 viewed in the light-irradiation direction, so that not all the pieces of sub data 42 are affected by a scratch. That is, in the optical disk apparatus 1, the pieces of sub data 42 recorded in the respective recording layers are recorded in the same-numbered tracks of the respective recording layers in a distributed manner such that they are away from each other by a given distance in the projection plane (see FIG. 1 and FIG. 7). FIG. 1 illustrates the present embodiment of the present invention, specifically illustrating one example of the respective recording positions for the pieces of sub data 42 in the projection plane of the optical disk 3 viewed from the light-irradiation direction. Further, FIG. 7 illustrates the present embodiment of the present invention, separately illustrating the recording layers so as to show where each of the recording positions for the pieces of data 42, illustrated in FIG. 1, is located on a corresponding recording layer.

That is, in the projection plane of the optical disk 3 viewed in the light-irradiation direction, the first sub data (element data) 42a, the second sub data (element data) 42b, and the third sub data (parity data) 42c are recorded in the respective recording layers in a distributed manner so that they are away from each other by at least a given distance and do not overlap each other. For example, in FIG. 7, the first sub data 42a, the second sub data 42b, and the third sub data 42c are recorded, in a distributed manner, into respective tracks n in the first recording layer 31, the second recording layer 32, and the third recording layer 33, respectively.

Figure 8:
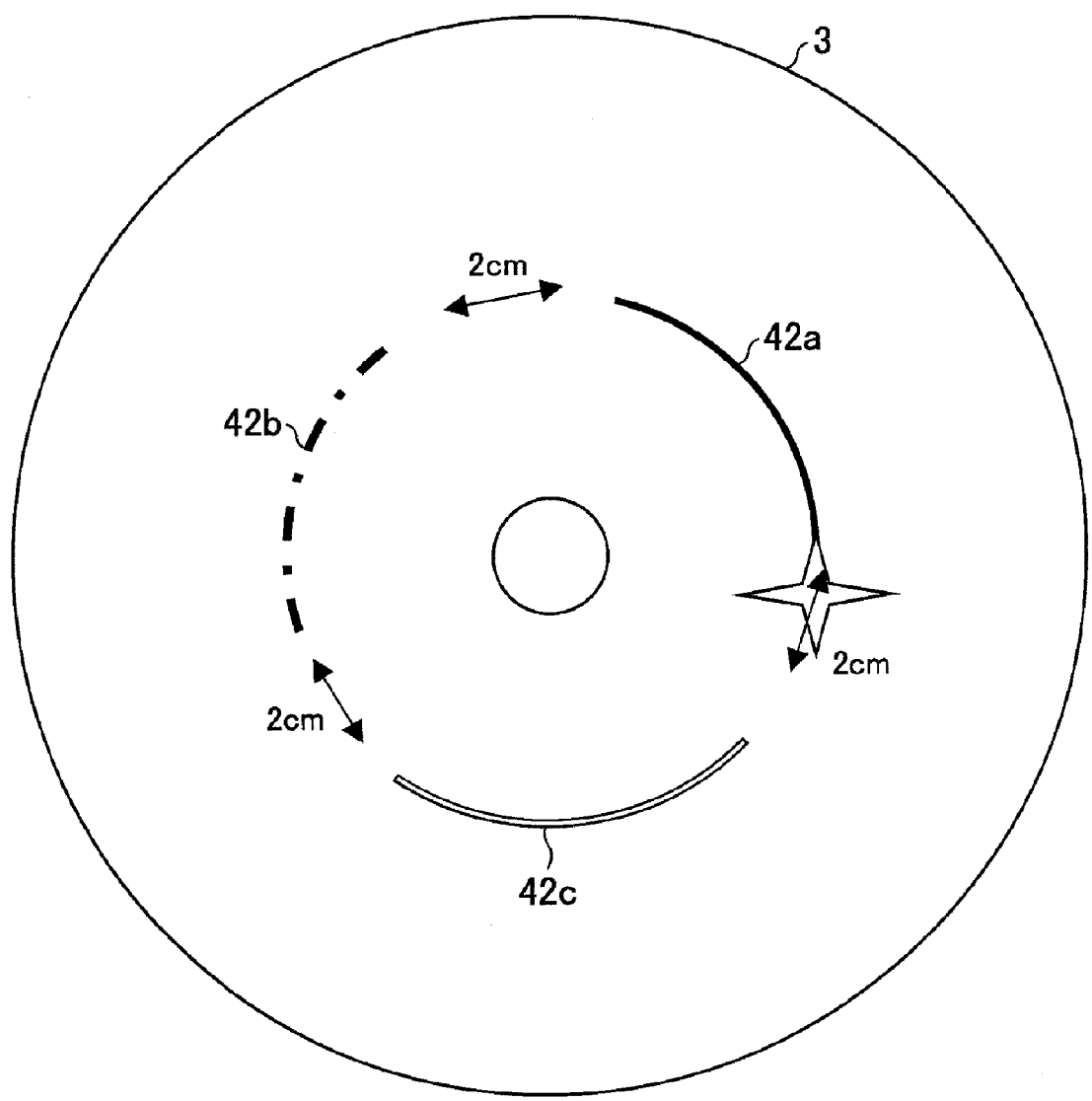
FIG. 8 illustrates an embodiment of the present invention, specifically illustrating one example of a positional relationship between respective sub-data recording positions and a position of a scratch formed on a protection layer, in a projection plane of an optical disk viewed in a light-irradiation direction.

Further, in a case where the scratch formed on the recording surface 30 is not more than 2 cm in size, the given distance between the respective pieces of sub data 42 is set to be not shorter than 2 cm in terms of reconstruction of the data block 41 (see FIG. 8). FIG. 8 illustrates the present embodiment of the present invention, specifically illustrating one example of a positional relationship between the respective recording positions for the pieces of sub data 42 and a position of the scratch formed on the protection layer, in the projection plane of the optical disk 3 viewed from the light-irradiation direction.

That is, the pieces of sub data 42 are distanced from each other by at least 2 cm in the projection plane. On this account, even in a case where a 2-cm scratch is formed on the protection layer on the recording surface 30 of the optical disk 3, the scratch does not cause 2 or more pieces of sub data 42 to have reading errors.

As described above, the optical disk apparatus 1 according to the present embodiment specifies different sectors of the same-numbered tracks on different recording layers and records the pieces of sub data 42 into the different sectors, respectively. With the arrangement, the pieces of sub data 42 do not overlap each other in the projection plane of the optical disk 3, and it is possible to make the pieces of sub data 42 away from each other by at least a given distance.

The optical disk apparatus 1 according to the present embodiment is arranged to carry out the recording of the pieces of sub data 42 into the different sectors thus specified in the different recording layers, as described above. The optical disk apparatus 1 is not limited to the arrangement, and may be so arranged to record the pieces of sub data 42 into different-numbered tracks in the different recording layers in such a manner that the pieces of sub data 42 are away from each other by at least a given distance in the projection plane (for example, see FIG. 9).

Figure 9:
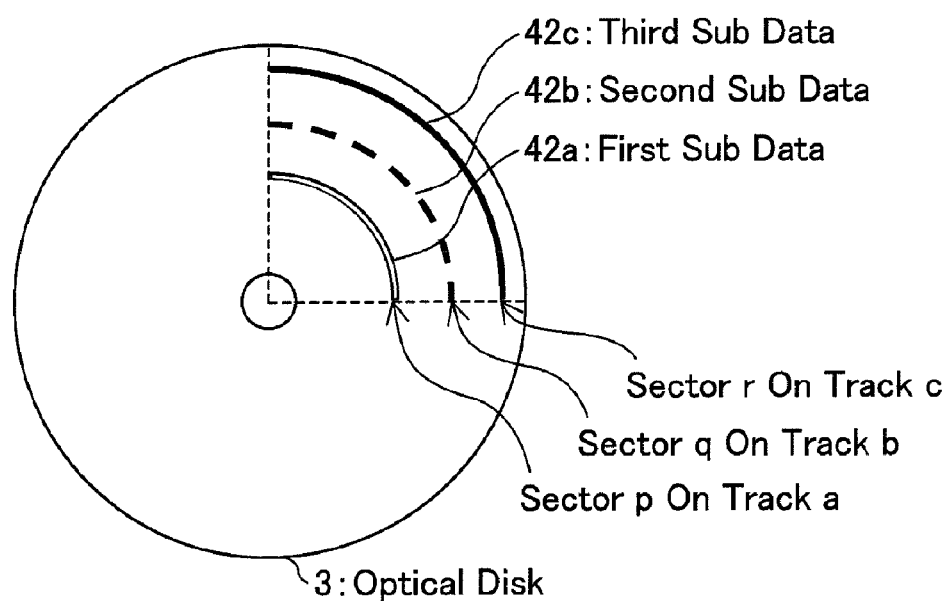
FIG. 9 illustrates an embodiment of the present invention, specifically illustrating one example of sub-data recording positions in a projection plane of an optical disk viewed in a light-irradiation direction.
Figure 10:
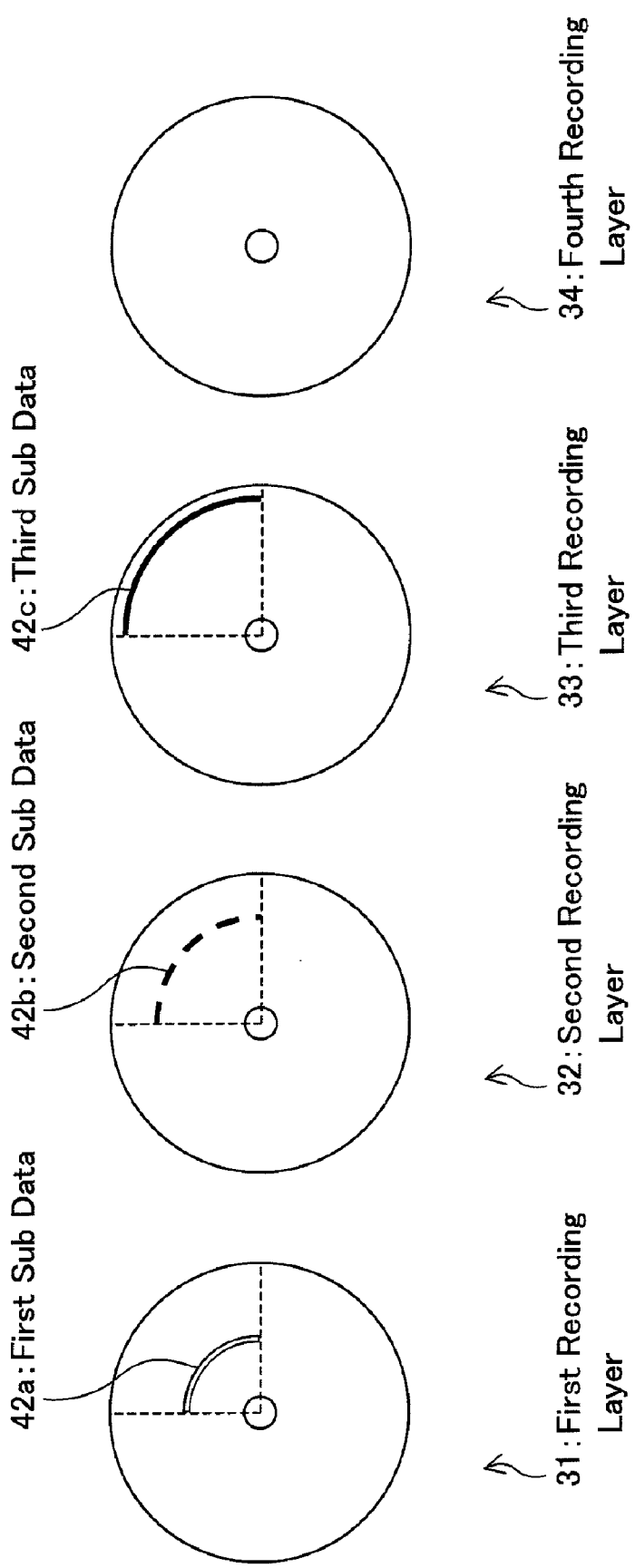
FIG. 10 illustrates an embodiment of the present invention, separately illustrating recording layers to show where each of the sub-data recording positions illustrated in FIG. 9 is located on a corresponding recording layer.

That is, the optical disk apparatus 1 may carry out data recording in a distributed manner such that (i) the first sub data 42a is recorded into a sector p on a track a of the first recording layer 31, (ii) the second sub data 42b is recorded into a sector q on a track b of the second recording layer 32, and (iii) the third sub data 42c is recorded into a sector r on a track c of the third recording layer 33 (see FIG. 10). FIG. 9 illustrates the present embodiment of the present invention, specifically illustrating an example of the recording positions for the pieces of sub data 42, in the projection plane of the optical disk 3 viewed from the light-irradiation direction. Further, FIG. 10 illustrates the present embodiment of the present invention, separately illustrating the recording layers to show where each of the recording positions for the pieces of sub data 42, illustrated in FIG. 9, is located on a corresponding recording layer.

Figure 11:
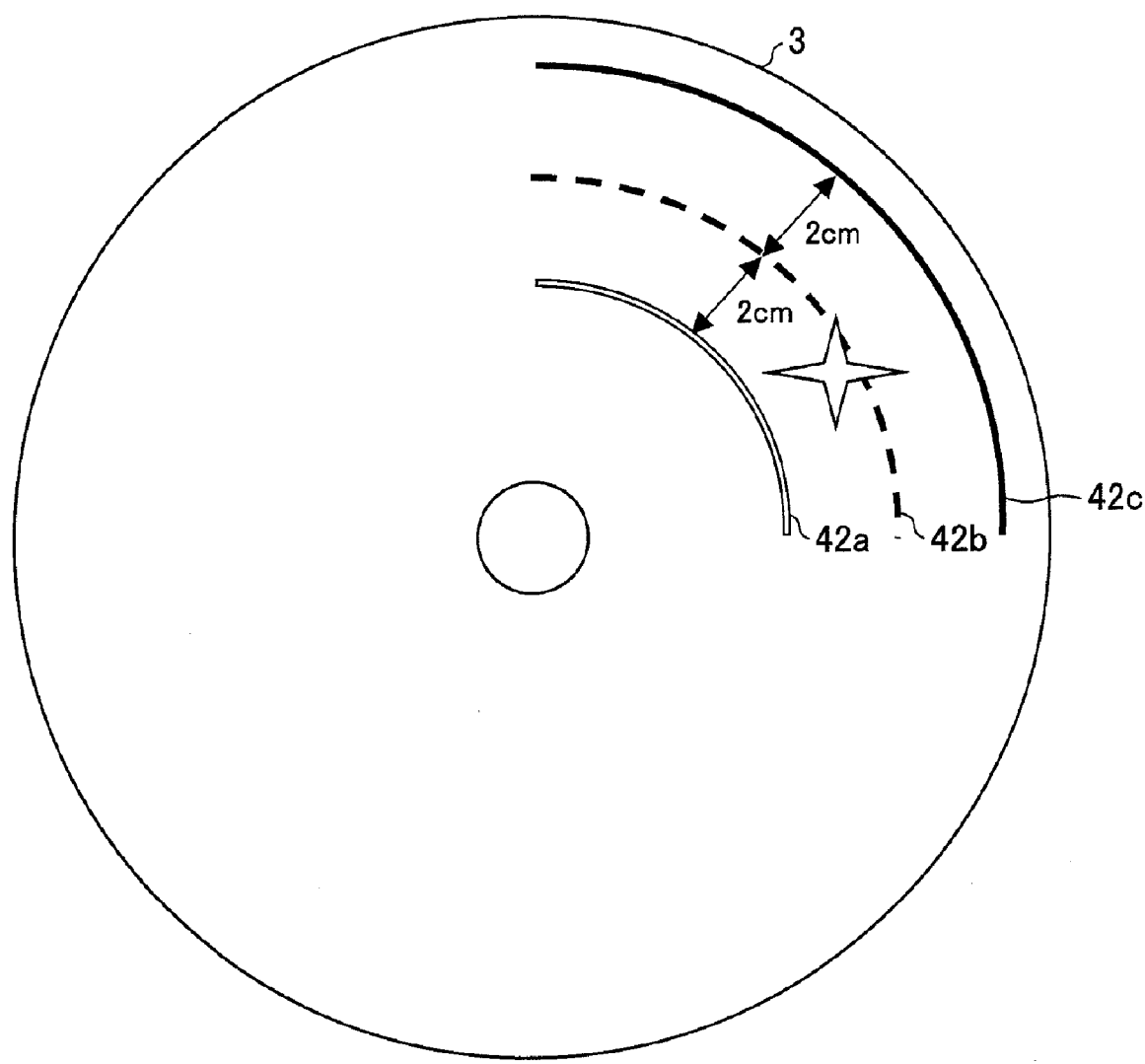
FIG. 11 illustrates an embodiment of the present invention, specifically illustrating one example of a positional relationship between respective sub-data recording positions and a position of a scratch formed on a protection layer, in a projection plane of an optical disk viewed in a light-irradiation direction.

In a case where the scratch formed on the recording layer 30 is not more than 2 cm in size, the pieces of sub data 42 are recorded into respective tracks so that the respective tracks are distanced from each other by at least 2 cm in consideration of reconstruction of the data block 41 (see FIG. 11). That is, the pieces of sub data 42 have such a positional relationship that they are recorded away from each other by at least 2 cm in the projection plane. With the arrangement, even in a case where a 2-cm scratch is formed on the protection layer on the recording surface 30, the scratch does not cause 2 or more pieces of sub data 42 to have reading errors. FIG. 11 illustrates the present embodiment of the present invention, specifically illustrating one example of a positional relationship between the respective recording positions for the pieces of sub data 42 and a position of the scratch formed on the protection layer, in the projection plane of the optical disk 3 viewed in the light-irradiation direction.

The given distance between the pieces of sub data 42 is not limited to 2 cm, and may be determined according to an allowable range, in the optical disk 3, of a size of a scratch, within which range the data block 41 can be reconstructed.

As described above, the recording positions for the pieces of sub data 42 are sectors on the different-numbered tracks on the different recording layers or different sectors on the same-numbered tracks on the different recording layers. However, the recording positions for the pieces of sub data 42 are not limited to the above arrangements, and may be different sectors on different-numbered tracks on the same recording layer provided that the respective recording positions for the pieces of sub data 42 are away from each other by the aforementioned given distance.

The sub-data recording position (recording position for sub data) can be specified based on a sector number and a track number as explained below, more specifically.

(Specifying of Sub-Data Recording Position)

Figure 12:
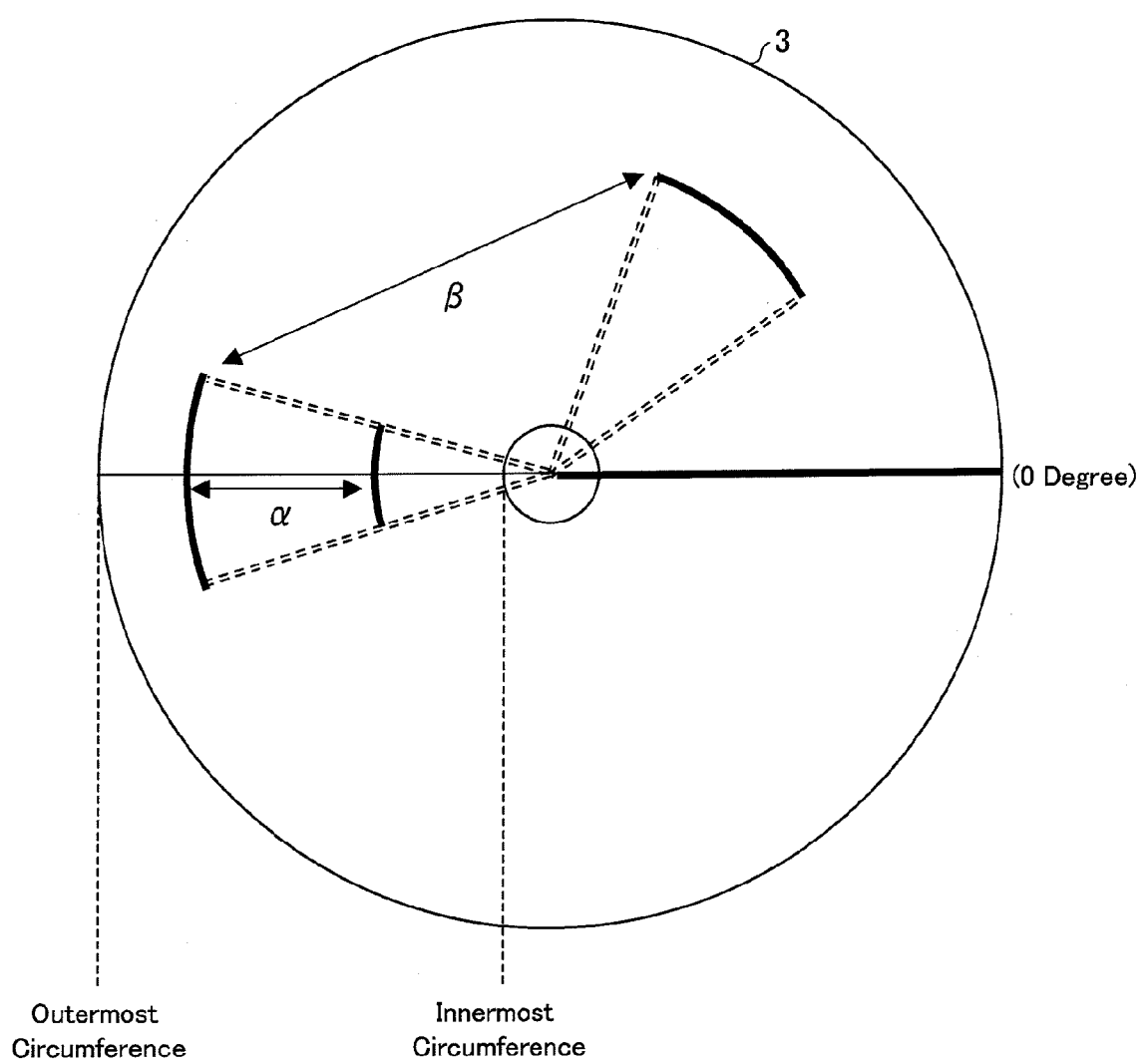
FIG. 12 illustrates an embodiment of the present invention, specifically illustrating a sub-data recording position in a projection plane of an optical disk and how to specify the sub-data recording position.

The optical disk apparatus (information processing apparatus) 1 according to the present embodiment is arranged such that the pieces of sub data 42 are recorded away from each other by a given distance in the projection plane, as described above. The following describes how to specify the recording positions for the pieces of sub data 42 in the optical disk apparatus 1 according to the present embodiment, more specifically, how the recording position determining section 70 finds the recording positions for the pieces of sub data 42, with reference to FIG. 12. FIG. 12 illustrates the present embodiment of the present invention, specifically illustrating a sub-data recording position in the projection plane of the optical disk 3 and how to specify the sub-data recording position.

In the optical disk 3 according to the present embodiment, the management information recorded in the lead-in area includes information on the number of tracks (for example, 100 tracks) in each recording layer and information on a distance (for example, 10 cm) between an innermost track and an outermost track in each recording layer. From these pieces of information, a distance between tracks can be found. Accordingly, it is possible to specify, in the projection plane, a shortest distance a between the pieces of sub data 42 recorded in respective sectors on different tracks.

Further, in a case where the pieces of sub data 42 are to be recorded in different sectors on the same-numbered tracks, it is possible to specify a positional relationship between the pieces of sub data 42 to be recorded, i.e., a distance ($\beta$) between the pieces of sub data 42, based on (i) recording start angles and recording end angles of the pieces of sub data 42 each from a reference position (0 degree) and (ii) the track number of the tracks in which to record the pieces of sub data 42, where a radius at a given position in the projection plane of the optical disk 3 is taken as the reference position (0 degree).

Alternatively, it is also possible to specify the positional relationship between the pieces of sub data 42 to be recorded, i.e., the distance ($\beta$) between the pieces of sub data 42, based on the number of sectors present between the pieces of sub data 42 and the track number of the tracks in which to record the pieces of sub data 42.

In the case where the positional relationship between the pieces of sub data 42, i.e., the distance between the pieces of sub data 42 to be recorded is specified based on the angles of the pieces of sub data 42 from the reference position or the number of sectors present between the pieces of sub data 42, even if the angels are the same or the number of sectors present between the pieces of sub data 42 is the same, the distance between the pieces of sub data 42 becomes different between a case where the tracks in which to record the pieces of sub data 42 are close to a center of the optical disk 3 and a case where the tracks in which to record the pieces of sub data 42 are close to the outer circumference of the optical disk 3.

In view of this, the optical disk apparatus 1 according to the present embodiment changes the angles from the reference position or the number of sectors, specified as the distance between recording positions for the pieces of sub data 42, depending on a distance, in the projection plane, from a center of the optical disk 3 to a respective of the tracks in which to record the pieces of sub data 42. That is, the shorter the distance from the center of the optical disk 3 to the respective of the tracks is, the larger the angles of the pieces of sub data 42 from the reference position is set to be or the larger the number of sectors between the pieces of sub data 42 is set to be.

As described above, the optical disk apparatus 1 according to the present embodiment can change the number of sectors defining the distance between the pieces of sub data 42 or the angles of the pieces of sub data 42 from the reference position which define the distance between the pieces of sub data 42, depending on the distance from the center of the optical disk 3 to a respective of the tracks in which to record the pieces of sub data 42.

In the above arrangement, the management information recorded in the lead-in area includes information on the number of tracks in each of the recording layers and information on the distance from the innermost track to the outermost track in each of the recording layers. However, another arrangement may be also adoptable.

For example, the management information recorded in the lead-in area may include sector position information for specifying sector positions in each of the recording layers.

Alternatively, the optical disk apparatus 1 may calculate the distance between the innermost track and the outermost track by detecting a boundary between the lead-in area and the data area and a boundary between the data area and the lead-out area in each of the recording layer of the optical disk 3.

More specifically, the recording position for the sub data 42 can be determined such that the recording position determining section 70 carries out the following calculation. For convenience of explanation, a radius of the optical disk 3 is 12 cm, a length of the data area in a direction of the radius of the optical disk 3 is 10 cm, and a maximum size of a scratch, which is allowable for reconstruction of the data block 41, is 2 cm. Further, the optical disk 3 includes 100 tracks in the data area in each of the recording layers, and each of the tracks includes 12 sectors. Moreover, the optical disk 3 includes 4 recording layers, and the recording layers are provided so as to be laminated on one another in the light-irradiation direction.

Information indicating that the length of the data area is 10 cm and information indicating that the number of tracks is 100 and the number of sectors is 12 are preliminarily included in the management information recorded in the lead-in area.

In the meantime, in the optical disk 3 according to the present embodiment, a track width is 1 mm as calculated from the length of the data area and the number of tracks. Further, the number of physical sectors is 1200 per recording layer (i.e., 100 tracks×12 sectors, sector numbers are from 0th to 1199th in each of the recording layers). That is, the total number of the physical sectors of the 4 recording layers is 4800.

In the present embodiment, 3 pieces of sub data 42 (one of them is parity data) are formed from the data block 41 and recorded in a distributed manner. That is, for access request to a single data block 41, 3 pieces of sub data 42 are recorded. In this case, assuming that a physical storage capacity of one sector in each of the recording layers is 512 bytes, a logical storage capacity of the single data block 41 is 1024 bytes/sector because one of the 3 pieces of sub data 42 is parity data.

Further, as described above, in the optical disk 3 according to the present embodiment, the track width is 1 mm. Therefore, in order to record the pieces of sub data 42 away from each other by at least 2 cm, it is necessary to record the pieces of sub data 42 away from each other by at least 20 tracks.

In view of this, a number (recording layer number) of a recording layer in which to record each of the pieces of sub data 42 can be obtained according to the following expression (1):

$$\text{Recording Layer Number} = ((\text{Data Block Number} \times 3 + (\text{Sub Data Number} - 1))\%4) + 1 \quad (1)$$

For example, in a case where a data block of a data block number "10" is accessed and a writing process of writing pieces of sub data 42 of the data block is carried out, respective recording layers in which to record the pieces of sub data 42 are determined according to the expression (1) as follows: the first sub data 42a is recorded in the third recording layer 33 $(=((10\times3+(1-1))\%4)+1)$; the second sub data 42b is recorded in the fourth recording layer 34 $(=((10\times3+(2-1))\%4)+1)$; and the third sub data 42c is recorded in the first recording layer 31 $(=((10\times3)+(3-1))\%4)+1)$.

Further, a sector address (physical sector number) of a sector in which to write each of the pieces of sub data 42 or from which to read each of the pieces of sub data 42, in a corresponding recording layer, can be obtained according to the following expression (2):

$$\text{Physical Sector Number} = (\text{Data Block Number} - (\text{Data Block Number} + (\text{Recording Layer Number} - 1)) \div 4 + (12 \times 20 \times (\text{Recording Layer Number} - 1)))\%(100 \times 12) \quad (2)$$

In this case, recording of a data block of a data block number "0" is carried out by use of the first, second, and third recording layers according to the expression (1). Further, the sector addresses of sectors in which to record respective pieces of sub data 42, which are constituents of the data block of the data block number "0", are determined according to the expression (2) as follows: a physical sector number of the sector to be used in the first recording layer 31 is 0; a physical sector number of the sector to be used in the second recording layer 32 is 240; and a physical sector number of the sector to be used in the third recording layer 33 is 480. Assuming that, in the first recording layer 31, a first piece of sub data 42 is written into a sector whose physical sector number is 0, which is located in the innermost track, respective first pieces of sub data for the second recording layer 32, the third recording layer 33, and the fourth recording layer 34 are not written into respective innermost tracks of the second to fourth recording layers (32, 33, 34). This is because pieces of sub data are written into respective tracks of the recording layers such that the respective tracks are distanced from each other by 20 tracks. In view of this, in the physical sector numbers in each of the second recording layer 32, the third recording layer 33, and the fourth recording layer 34, after data recording into a sector of a sector number "1199" is carried out, data recording is then carried out with respect to a sector of a sector number "0", which is located in the innermost track. For this reason, in the expression (2), calculation of "%(100×12)" is carried out by use of a modulus operator to find a physical sector.

For example, it is assumed that a data block of a data block number "10" is accessed and a writing process of writing pieces of sub data 42 of the data block of the data block number "10" is carried out. In this case, respective physical sectors for the pieces of sub data 42 are found according to the expression (2) and accessed so as to write the pieces of sub data 42 therein as follows: For the first sub data 42a, a physical sector whose number is 487 $(=10-(10+(3-1))\div4+(12\times20\times(3-1)))\%(100\times12))$ is accessed, and the first sub data 42a is written therein. For the second sub data 42b, a physical sector whose number is 727 $(=10-(10+(4-1))\div4+(12\times20\times(4-1)))\%(100\times12))$ is accessed, and the second sub data 42b is written therein. For the third sub data 42c, a physical sector whose number is 8 $(=10-(10+(1-1))\div4+(12\times20\times(1-1)))\%(100\times12))$ is accessed, and the third sub data 42c is written therein.

The expression (2) is used for finding a physical sector in each recording layer in a case where pieces of sub data 42 are recorded in respective recording layers such that respective tracks in which to record the pieces of sub data 42 are distanced from each other by at least 2 cm in the projection plane. However, it is also possible to find the physical sector numbers according to the following expression (3), which allow the pieces of sub data 42 to be recorded away from each other by at least 2 cm, in the projection plane, on the same-numbered tracks in the respective recording layers. According to the expression (3), the pieces of sub data 42 are recorded in the respective recording layers so that respective sectors in which to record the pieces of sub data 42 are distanced from one another by 3 sectors, i.e., by a central angle of 90° in the recording surface 30.

$$\text{Physical Sector Number} = ((\text{Data Block Number}/12) \times 12) + ((\text{Data Block Number} + ((\text{Recording Layer Number} - 1) \times 3))\%12) \quad (3)$$

For example, in a case where a data block of a data block number "10" is accessed and a writing process of writing pieces of sub data 42 of the data block of the data block number "10" is carried out, respective physical sectors for the pieces of sub data 42 are found according to the expression (3) and accessed so as to write the pieces of sub data 42 therein as follows: the first sub data 42a is written into a physical sector whose number is 4 ($=((10/12) \times 12) + ((10+(3-1) \times 3)\%12)$); the second sub data 42b is written into a physical sector whose number is 7 ($=((10/12) \times 12) + ((10+(4-1) \times 3)\%12)$); and the third sub data 42c is written into a physical sector whose number is 10 ($=((10/12) \times 12) + ((10+(1-1) \times 3)\%12)$).

As described above, the recording position determining section 70 can determine the recording positions for the pieces of sub data by use of the addresses of the tracks or the sectors so that the recording positions do not overlap each other. This allows the optical disk apparatus 1 according to the present embodiment to easily determine the sub-data recording positions.

(Data Writing Process and Data Reading Process)

Figure 13:
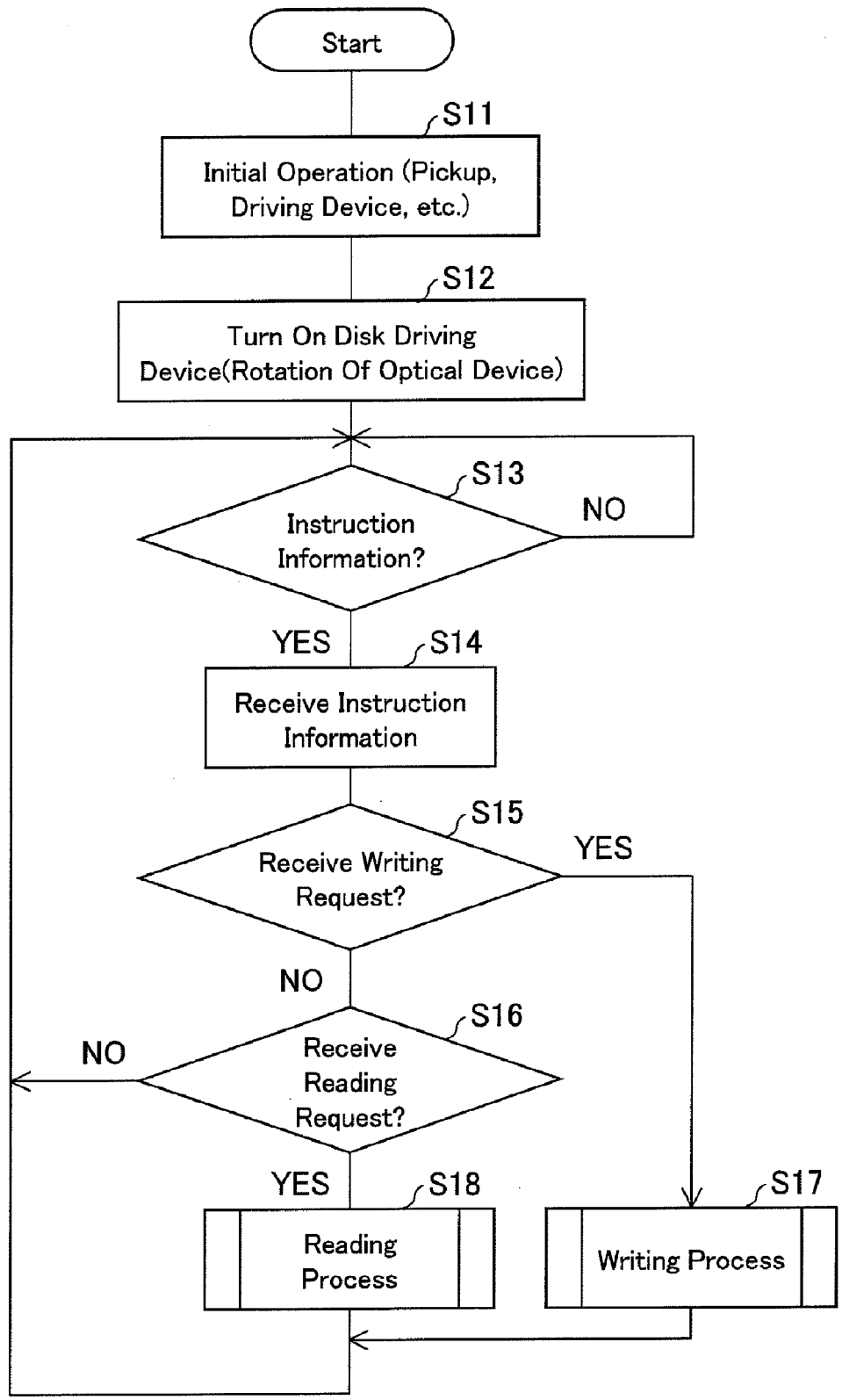
FIG. 13 is a flowchart illustrating a process flow of data writing and data reading in an optical disk apparatus in accordance with an embodiment of the present invention.

Next explained is a process flow of a writing process and a reading process of data block 41, carried out by the optical disk apparatus 1 according to the present embodiment, with reference to FIG. 13. FIG. 13 is a flowchart illustrating a process flow of the writing process and reading process of the data block 41, carried out by the optical disk apparatus 1, in accordance with the present embodiment of the present invention.

Initially, the optical disk controller 14 controls the optical head 11 and the disk driving device 12 to carry out initial operations (Step S11, hereinafter, referred to just as S11). As the initial operations, for example, the optical disk controller 14 controls the optical head 11 and the disk driving device 12 to execute self-tests of testing whether the optical head 11 and the driving device 12 themselves operate normally, and controls the optical head 11 to move to an initial position.

Then, the optical disk controller 14 instructs the disk driving device 12 to rotate the optical disk 3 (S12).

Thus, the optical disk apparatus 1 is ready for carrying out the writing process or the reading process of the data block 41. Subsequently, the optical disk controller checks whether or not the host I/F 13 receives instruction information from the personal computer 2 (S13).

In S13, in a case where the optical disk controller 14 determines that the host I/F 13 receives the instruction information ("YES" in S13), the optical disk controller 14 advances its process to S14. In S14, the optical disk controller 14 receives the instruction information from the host I/F 13. On the other hand, in a case where no instruction information is received, the optical disk controller 14 carries out the process of S13 again until any instruction information is entered from the personal computer 2.

After receiving the instruction information in S14, the optical disk controller 14 determines whether or not the instruction information is an instruction to write a data block 41 (S15), or determines whether or not the instruction information is an instruction to read a data block 41 (S16). More specifically, in a case of YES in the step S15, the optical disk controller 14 carries out a writing process (S17).

On the other hand, in a case of NO in S15, the process of the optical disk controller 14 proceeds to S16, and the optical disk controller 14 determines whether or not the instruction information is an instruction to read a data block 41. In a case of YES in S16, the optical disk controller 14 carries out a reading process (S18). In a case of NO in S16, the process of the optical disk controller 14 returns to S13 and the optical disk controller 14 waits until next instruction information is entered.

After the writing process in S17 or the reading process in S18 is executed, the process of the optical disk controller 14 returns back to S13 and waits for next instruction information. In this way, the optical disk controller 14 waits until the instruction information is entered from the personal computer 2, and repeatedly carries out the reading process or the writing process in accordance with the instruction information.

In the flowchart illustrated in FIG. 13, the optical disk controller 14 determines, in S15, whether or not the instruction information received from the personal computer 2 is a request for writing, and then determines, in S16, whether or not the instruction information is a request for reading. However, the order of these steps is not limited to this. That is, the optical disk controller 14 may be so arranged to initially determine whether the instruction information received from the personal computer 2 is a request for reading, and then determine whether or not the instruction information is a request for writing.

(Writing Process)

Figure 14:
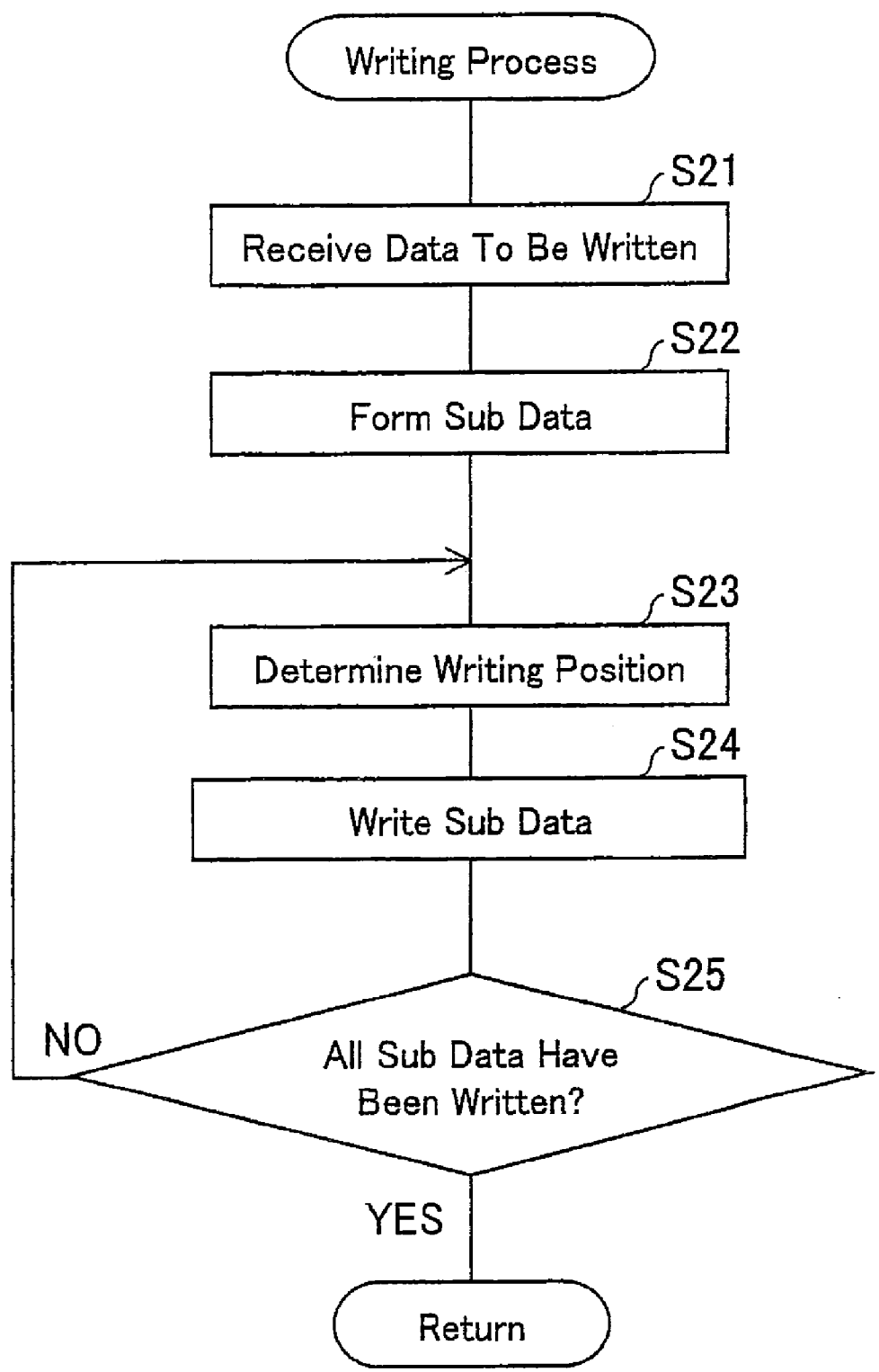
FIG. 14 is a flowchart illustrating a process flow of data writing in an optical disk apparatus in accordance with an embodiment of the present invention.

The following describes how to carry out the writing process in S17 more specifically, with reference to FIG. 14. FIG. 14 is a flowchart illustrating a flow of the writing process in the optical disk apparatus 1 in accordance with the present embodiment of the present invention.

When the optical disk controller 14 determines that the instruction information received from the personal computer 2 is a request for writing a data block 41 into the optical disk 3, the optical disk controller 14 receives via the host I/F 13 a target data block 41 to be written from the personal computer 2 (S21).

The optical disk controller 14 sends the target data block 41 thus received to the sub-data forming section 71. The sub-data forming section 71 forms pieces of sub data 42 from the target data block 41 (S22). In the optical disk apparatus 1 according to the present embodiment, as the sub data 42, 3 pieces of sub data 42 are formed as follows: 2 pieces of element data that are constituents of the target data block 41; and reconstruction data including parity data for reconstructing the target data block 41 even if either one of the 2 pieces of element data is lost. After forming the pieces of sub data 42 from the target data block 41, the sub-data forming section 71 stores the pieces of sub data 42 into a corresponding sub-data storage area in the RAM 15.

After the sub data 42 is stored in the RAM 15, the recording position determining section 70 carries out the calculation as described in "Specifying of Sub-data Recording Position", and determines a writing position (a recording layer and a physical sector number) (S23).

When the writing position (the recording layer and the physical sector) for the sub data 42 is determined, the optical disk controller 14 controls the optical head 11 to move to the determined writing position. Then, the optical disk controller 14 sends, to the optical head 11, information of the sub data 42 to be written at that position, and instructs the optical head 11 to write the sub data 42 therein.

The optical head 11, in response to the instruction from the optical disk controller 14, irradiates light to the optical disk 3 to record the information of the sub data 42 into the physical sector at the physical sector number thus determined. Thus, the sub data 42 is written into the optical disk 3 (S24).

Then, the optical disk controller 14 determines whether or not writing of all the pieces of sub data 42 formed from the target data block 41 is completed (S25). If the writing of all the pieces of sub data 42 has not been completed yet (NO in S25), the optical disk controller 14 carries out the processes of S23 and S24 again. When the writing of all the pieces of sub data 42 formed from the target data block 41 is completed (YES in S25), the optical disk controller 14 ends the writing process.

(Reading Process)

Figure 15:
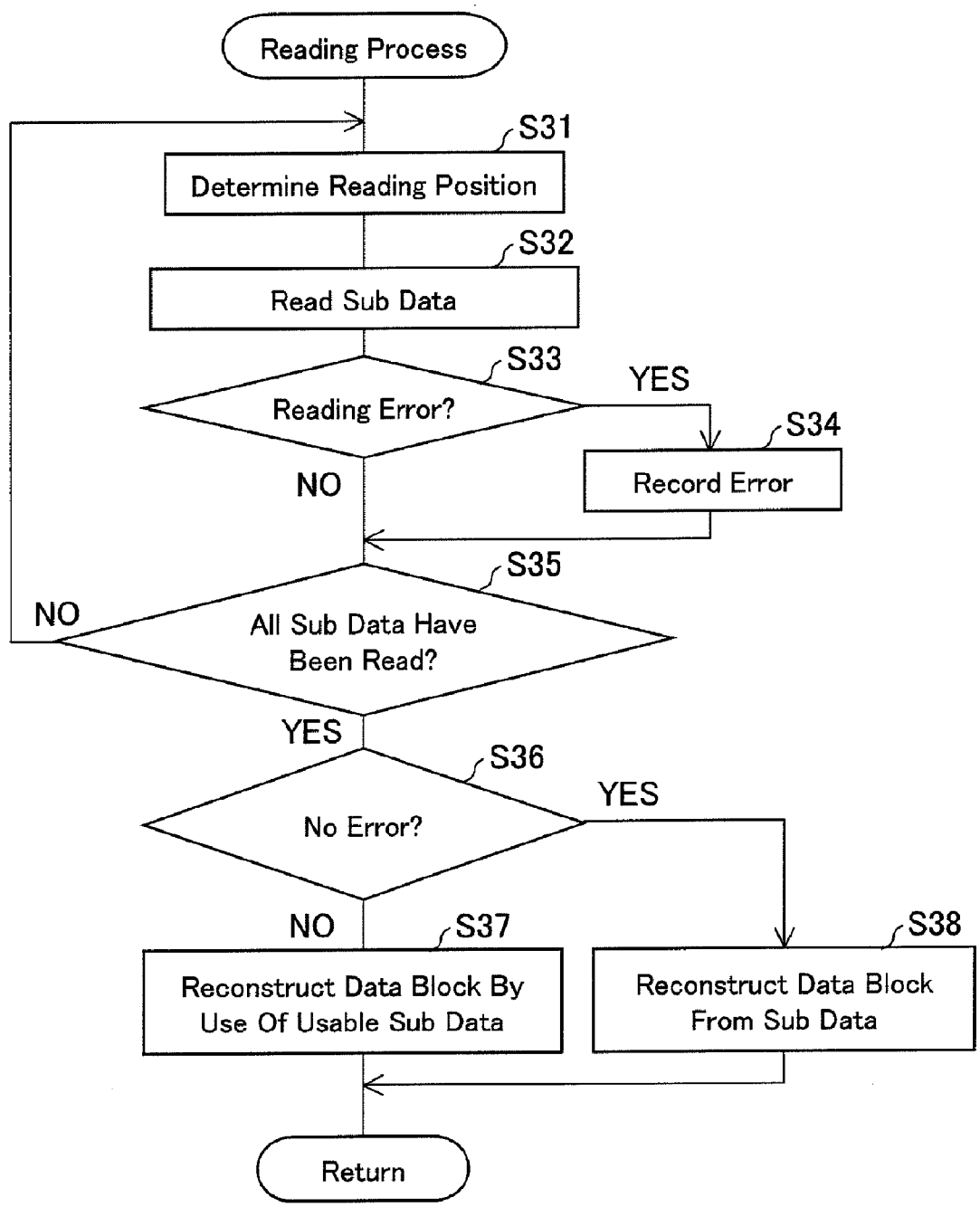
FIG. 15 is a flowchart illustrating a process flow of data reading in an optical disk apparatus in accordance with an embodiment of the present invention.

The following describes how to carry out the reading process in S18 more specifically, with reference to FIG. 15. FIG. 15 is a flowchart illustrating a flow of the reading process in the optical disk apparatus 1 in accordance with the present embodiment of the present invention.

When the optical disk controller 14 determines that the instruction information received from the personal computer 2 is a request for reading a target data block 41 from the optical disk 3, the data reconstruction section 72 determines a reading position of the target data block 41 in accordance with the instruction from the personal computer 2 (S31).

That is, based on a data block number of the target data block 41, the data reconstruction section 72 carried out the calculation as described in "Specifying of Sub-data Recording Position" so that the data reconstruction section 72 can identify respective recording positions of the pieces of sub data.

When the recording position determining section 70 determines a reading position of the sub data 42, the optical disk controller 14 instructs the optical head 11 to move to a corresponding position to the reading position. In response to the instruction, the optical head 11 moves to the corresponding position to the reading position of the sub data 42, and irradiates light thereto so as to read the sub data 42 by irradiating light (S32). Then, the optical head 11 sends a reading result to the optical disk controller 14.

When the error information managing section 73 receives the reading result from the optical head 11, the optical disk controller 14 determines whether or not any error occurs in the sub data 42 thus read (S33). In a case where the optical disk controller 14 determines that an error occurs in the reading result of the sub data 42 (YES in S33), the error information managing section 73 records that the sub data 42 causes an error at the time of reading (S34). That is, error information 18 is recorded in the RAM 15. The error information 18 indicates sub data having an error by marking it with a flag "1" so that which one of the first sub data 42a, the second sub data 42b, and the third sub data 43 causes an error at the time of reading can be identified (see FIG. 16). FIG. 16 illustrates an example of the error information 18 in accordance with the present embodiment of the present invention.

In a case where no error is found in the reading result of the sub data 42 (NO in S33), the optical disk controller 14 determines whether or not reading of all pieces of sub data 42 is completed (S35). In a case where an error is found in the reading result of the read sub data 42 (YES in S33), the error information managing section 73 records the error information 18 into the RAM 15 (S34). Then, the optical disk controller 14 determines whether or not the reading of all the pieces of sub data 42 is completed (S35). In a case where the reading of all the pieces of sub data 42 has not been completed yet (NO in S35), the optical disk controller repeatedly carries out the processes from S31 to S34 until all the pieces of sub data 42 are read.

On the other hand, in a case where all the pieces of sub data 42 formed from the target data block 41 has been completed (YES in S35), the data reconstruction section 72 in the optical disk controller 14 refers to the error information 18 recorded in the RAM 15 and determines whether or not any error is found (S36).

In a case where the data reconstruction section 72 determines that no error occurs in the reading results of the pieces of sub data 42 (NO in S36), the data reconstruction section 72 reconstructs the target data block 41 from given pieces of sub data 42 (the first sub data 42a and the second sub data 42b) exclusive of the parity data (S37). In contrast, in a case where an error occurs in the reading results of the pieces of sub data 42 (YES in S36), the data reconstruction section 72 reconstructs the data block 41 from usable piece(s) of sub data 42 in which no error is found (S38). For example, in a case where an error occurs in the reading result of the first sub data 42a, the first sub data 42a is reconstructed from the second sub data 42b and the third sub data 42c, which is parity data. Then, the target data block 41 is reconstructed from the first sub data 42a thus reconstructed and the second sub data 42b (S38).

After the data block 41 is reconstructed as such, the optical disk controller 14 sends via the host I/F 13 the reconstructed data block 41 to the personal computer 2.

In this way, the optical disk apparatus 1 according to the present embodiment carries out the reading process of reading the data block 41.

In the above arrangement, upon receiving instruction information on the writing process of the data block 41 from the personal computer 2, the recording position determining section 70 determines a writing position for the sub block 42 that is formed by the sub-data forming section 71 from the data block 41. Then, the optical disk controller 14 controls the optical head 11 and the disk driving device 12 to write the sub data 42 into the optical disk 3. Further, in the above arrangement, upon receiving instruction information on the reading process from the personal computer 2, the recording position determining section 70 determines a reading position of the sub data 42. Then, the optical disk controller 14 controls the optical head 11 and the disk driving device to read the sub data 42 from the optical disk 3. Subsequently, the data reconstruction section 72 reconstructs the data block 41 and sends it to the personal computer 2.

Figure 17:
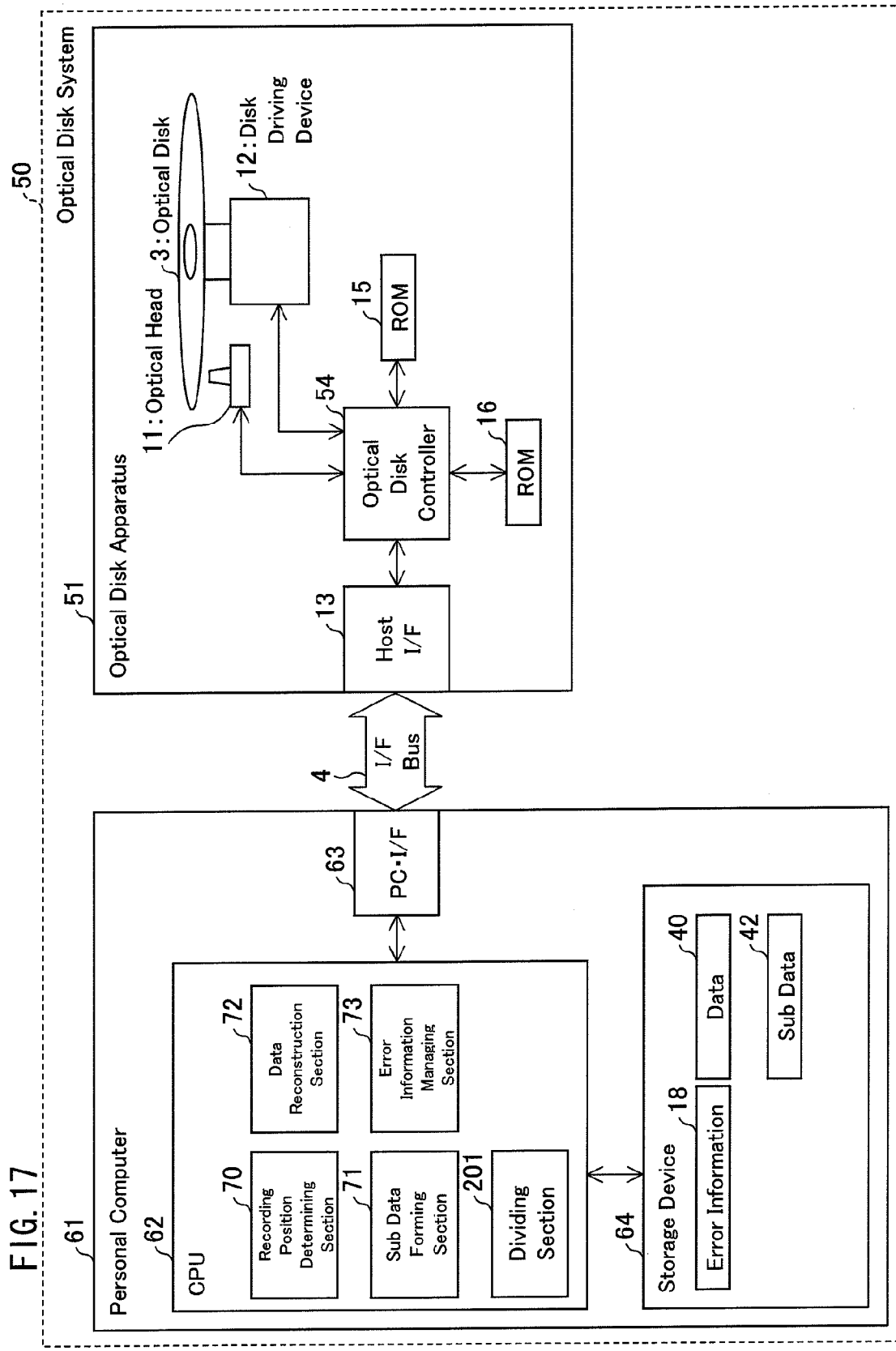
FIG. 17 is a block diagram illustrating an arrangement of essential parts of an optical disk system in accordance with an embodiment of the present invention.

However, the writing process and reading process of the sub data 42 of the data block 41 may be executed by an optical disk system (information processing apparatus) 50 (see FIG. 17). In this case, the optical disk system 50 realizes the information processing apparatus of the present invention. FIG. 17 is a block diagram illustrating an arrangement of essential parts of the optical disk system 50 in accordance with the present embodiment of the present invention.

More specifically, the optical disk system 50 includes: a personal computer 61, which carries out various control instructions on data writing (writing process) and data reading (reading process) with respect to the optical disk 3; and an optical disk apparatus 51, which writes a data block 41 into the optical disk 3 in accordance with a control instruction from the personal computer 61 or reads a data block 41 from the optical disk 3 in accordance with a control instruction from the personal computer 61. The personal computer 61 and the optical disk apparatus 51 are communicably connected to each other via an I/F bus 4.

The personal computer 61 includes: a CPU (recording position determining means, forming means) 62, which carries out various controls of the personal computer 61; a personal computer I/F (PC·I/F) 63, which serves as an interface to the optical disk apparatus 51; and a storage device 64 in which an application program for realizing various controls of the personal computer 61 and the like are stored.

The optical disk apparatus 51 includes: an optical disk controller 54, which controls the writing process or reading process of the data block 41, carried out by the optical disk apparatus 51 with respect to the optical disk 3; an optical head 11 for reading sub data 42 of the data block 41 from the optical disk 3 or for writing sub data 42 of the data block 41 into the optical disk 3, in accordance with a control instruction from the optical disk controller 54; a disk driving device 12 for rotating the optical disk 3 in accordance with a control instruction from the optical disk controller 54; and a host I/F 13, which serves as an interface to the personal computer 2.

The optical disk system 50 illustrated in FIG. 17 is different from the optical disk apparatus 1 illustrated in FIG. 2 in that: (i) in the case of the optical disk 50, the CPU 62 of the personal computer 61 includes a recording position determining section 70, a sub-data forming section 71, a data reconstruction section 72, and an error information managing section 73, while they are provided in the optical disk controller 14 in the case of the optical disk apparatus 1 (see FIG. 2); (ii) the CPU 62 further includes a dividing section 201 in addition to the above sections; and (iii) the CPU 62 carries out processes (a) through (f) described below. The recording position determining section 70, the sub-data forming section 71, the data reconstruction 72, and the error information managing section 73, which are provided in the CPU 62, are respectively the same as the recording position determining section 70, the sub-data forming section 71, the data reconstruction section 72, and the error information managing section 73, which are provided in the optical disk controller 14 illustrated in FIG. 2. Therefore, explanations about these sections are omitted and they have the same reference signs as those in FIG. 2. The processes (a) through (f) carried out by the CPU 62 are as follows:

(a) the dividing section 201 divides data 40 to be written into the optical disk 3, into data blocks 41, and the sub-data forming section 71 forms sub data 42 from each of the data blocks 41;

(b) the sub-data forming section 71 stores in the storage device 64 the sub data 42 thus formed, along with other data such as an application program, so as to mange the sub data 42;

(c) the recording position determining section 70 carries out calculation for finding a writing position of the sub data 42 to be recorded into the optical disk 3 and calculation for finding a reading position of the sub data 42 that has been recorded in the optical disk 3;

(d) the data reconstruction section 72 reconstructs the data 40 from the sub data 40 read from the optical disk 3;

(e) the error information managing section 73 determines whether or not any reading error occurs in the sub data 42 read from the optical disk 3; and (f) the error information managing section 73 stores in the storage device 64 information on sub data 42 that causes a reading error, so as to mange the information. That is, among the functions of the optical disk controller 14 provided in the optical disk apparatus 1, the processes related to management of the sub data 42 are carried out by the CPU 62 in the personal computer 61. Namely, in the optical disk apparatus 1, the optical disk controller 14 carries out the formation of sub data 42, the determination of a recording position of the sub data 42, writing and reading of the sub data 42, and the reconstruction of data block 41. On the other hand, in the optical disk system 50, the CPU 62 of the personal computer 61 carries out the processes carried out by the optical disk controller 14. The CPU 62 can realize the processes (a) through (f) by loading the program stored in the storage device 64 into RAM (not shown) or the like.

Figure 18:
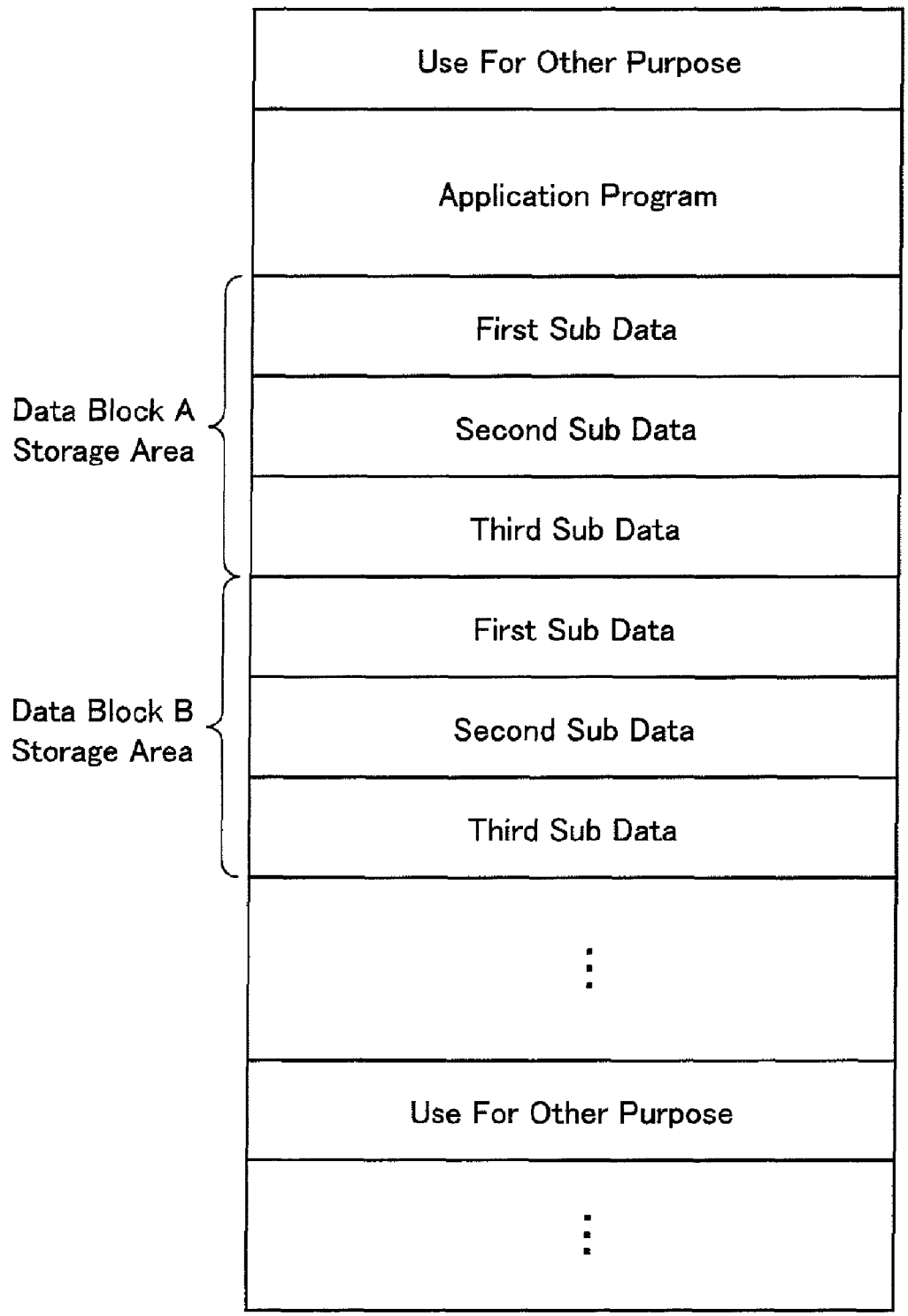
FIG. 18 illustrates one example of sub-data recording positions in a storage device in accordance with an embodiment of the present invention.

Further, the CPU 62 stores, in a data block storage area in the storage device 64, the pieces of sub data 42 thus formed, in the order of combination of the pieces of sub data 42 (i.e., the first sub data 42$a$, the second sub data 42$b$, the third sub data 42$c$) (see FIG. 18). The pieces of sub data 42 are stored in the data block storage area per data block 41. FIG. 18 illustrates one example of recording positions of pieces of sub data 42 in the storage device 64 in accordance with the present embodiment of the present invention.

More specifically, as illustrated in FIG. 18, the storage device 64 is provided with (i) an area (other use area) for various processes, exclusive of the writing process or the reading process with respect to the optical disk 3, carried out by the personal computer 61, (ii) an area in which to store an application program to be executed, and (iii) a data block storage area.

In a case where the CPU 62 of the personal computer 61 controls the writing process and the reading process of the data 40 in accordance with the present embodiment like the optical disk system 50 described above, the optical disk apparatus 51 can be realized by a conventional optical drive provided that the optical drive includes the host I/F 13 for communicating with the personal computer 61. In this case, the host I/F 13 is not necessarily an I/F only for the optical disk, but may be a network I/F such as Ethernet.

As described above, the optical disk apparatus 1 or the optical disk system 50 in accordance with the present embodiment is so arranged that pieces of sub data 42 are recorded at respective recording positions in different recording layers in a distributed manner such that the respective recording positions do not overlap each other in a projection plane of the optical disk viewed in the light-irradiation direction in which the irradiated light travels toward the recording surface 30.

In the arrangement, the pieces of sub data 42 are recorded away from each other by at least a given distance in the projection plane. This makes it possible to prevent that a scratch formed on a protection layer of the optical disk 3 damages 2 or more pieces of sub data 42. Further, the pieces of sub data 42 includes (a) pieces of element data formed by dividing a data block 41 into the pieces, and (b) reconstruction data as parity data, which enables reconstruction of the data block 41 even if any one of the pieces of element data is lost.

That is, the above arrangement can prevent such a problem that the scratch on the protection layer causes an error in reading results of a plurality of sub data 42 and renders the data block 41 unreconstructible. Namely, either of the optical disk apparatus 1 and the optical disk system according to the present embodiment can improve reliability of reconstruction of data 40 in which data loss occurs, in a case where the data 40 is recorded into a plurality of recording layers of the optical disk 3.

Further, the optical disk apparatus 1 and the optical disk system 50 in accordance with the present embodiment are arranged so as to manage whether any error occurs in reading results of the pieces of sub data 42 at the time of reading the data 40 from the optical disk 3. This makes it possible to figure out whether or not any scratch is formed on the optical disk 3. On this account, the optical disk apparatus 1 or the personal computer 2 may include a display section (not shown) so as to display on the display section a message indicating that the optical disk 3 is damaged in such a case where the scratch is formed on the optical disk 3. With this arrangement, a user can be notified that the optical disk 3 is damaged so that the user can read the data 40 from the damaged optical disk 3 before the data 40 becomes unreconstructible, and then record the data 40 into another optical disk 3.

The above arrangement is such that pieces of sub data constituting a data block 41 are recorded in the same-numbered tracks in respective recording layers such that they are recorded away from each other by at least a given distance (for example, 2 cm) in the projection plane, or alternatively they are recorded in different-numbered tracks in the respective recording layers such that they are recorded away from each other by at least a given distance (for example, 2 cm) in the projection plane.

Figure 19:
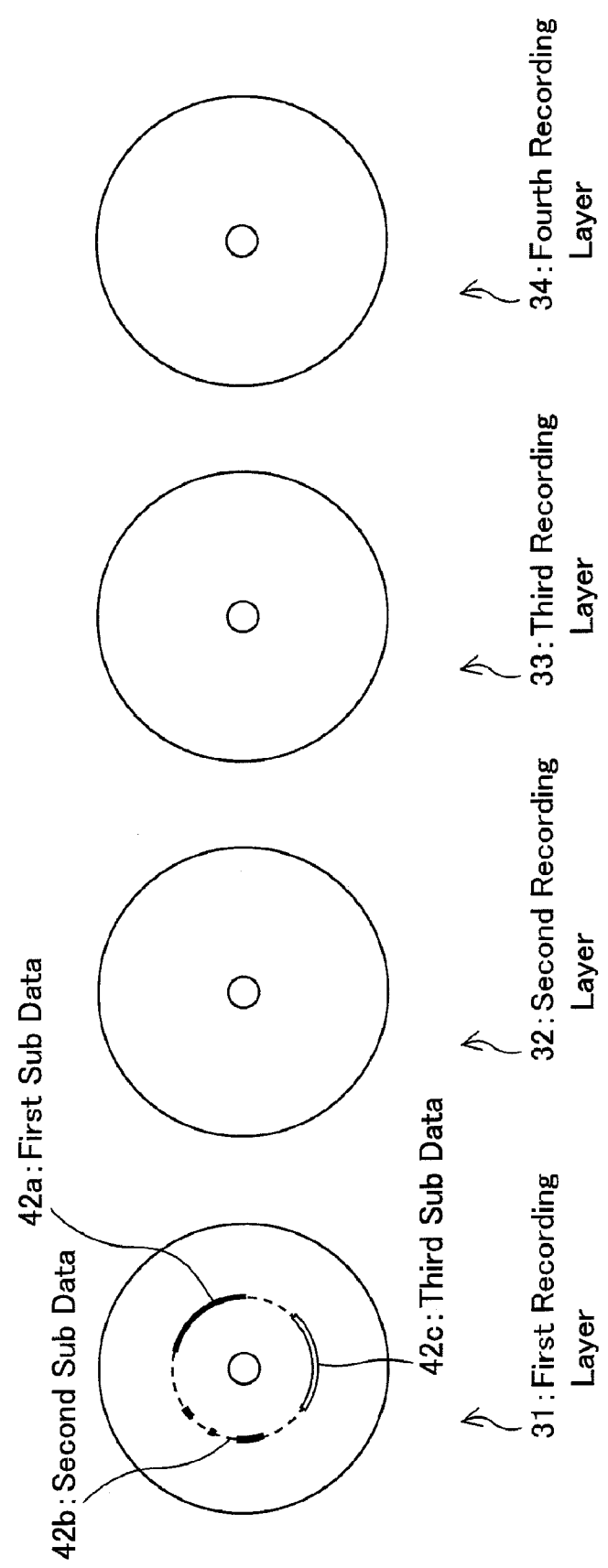
FIG. 19 illustrates an embodiment of the present invention, separately illustrating recording layers to show where each sub-data recording position is located on a corresponding recording layer.

In this regard, the recording of the pieces of sub data 42 is not necessarily carried out in accordance with the above arrangement, provided that the pieces of sub data 42 are recorded away from each other by at least a given distance in the projection plane. Further, the pieces of sub data 42 are not necessarily recorded in different layers in a distributed manner, and may be recorded in the same recording layer (e.g., the first recording layer in FIG. 19) in such a manner that the pieces of sub data 42 are recorded away from each other by at least a given distance. FIG. 19 illustrates the present embodiment of the present invention, separately illustrating recording layers to show where each sub-data recording position is located on a corresponding recording layer.

Further, the description is given on the premise that the optical disk 3 includes 4 recording layers. However, the number of recording layers may vary depending on the arrangement of the optical disk 3, and the optical disk 3 may include 2, 3, or 4 or more recording layers. On this account, either of the optical disk apparatus 1 and the optical disk system 50 in accordance with the present embodiment is preferably arranged such that it can check how many recording layers the optical disk 3 has, before the writing process or reading process of the data block 41 is carried out with respect to the optical disk 3.

In this case, either of the optical disk apparatus 1 and the optical disk system 50 in accordance with the present embodiment may be so arranged that it can detect the number of recording layers in the optical disk 3 by focusing. Alternatively, either of the optical disk apparatus 1 and the optical disk system 50 may be so arranged that the number of recording layers are recorded into a lead-in area of the optical disk 3 in advance and the optical disk apparatus 1 or the optical disk system 50 reads out the number of recording layers therefrom. The checking of the number of recording layers is carried out before S12.

Further, as described above, the optical disk apparatus 1 or the optical disk system 50 in accordance with the present embodiment is arranged such that the pieces of sub data 42 include (i) pieces of element data into which a data block 41 are broken and (ii) reconstruction data including parity information obtained from the pieces of data. However, the pieces of sub data 42 are not limited to these pieces of data, and may be data of the data bock 41 and reconstruction data, which is a copy of the data.

Embodiment 2

In the aforementioned optical disk apparatus 1 or optical disk system 50, the track address and the sector address, i.e., the track number and the sector number are assigned in a corresponding manner in the first recording layer 31, the second recording layer 32, the third recording layer 33, and the fourth recording layer 34. That is, in these recording layers, sectors having the same sector number overlap each other in the projection plane of the optical disk 3 and tracks having the same track number also overlap each other in the projection plane of the optical disk 3.

Further, in the above arrangement, on the premise that the track address and the sector address are assigned as such, the recording position determining section 70 calculates respective recording layer numbers, respective sector numbers, and respective track numbers for pieces of sub data 42 so that respective recording positions for the pieces of sub data 42 do not overlap each other in the projection plane. The pieces of sub data 42 are accordingly recorded in the respective recording positions.

Figure 20:
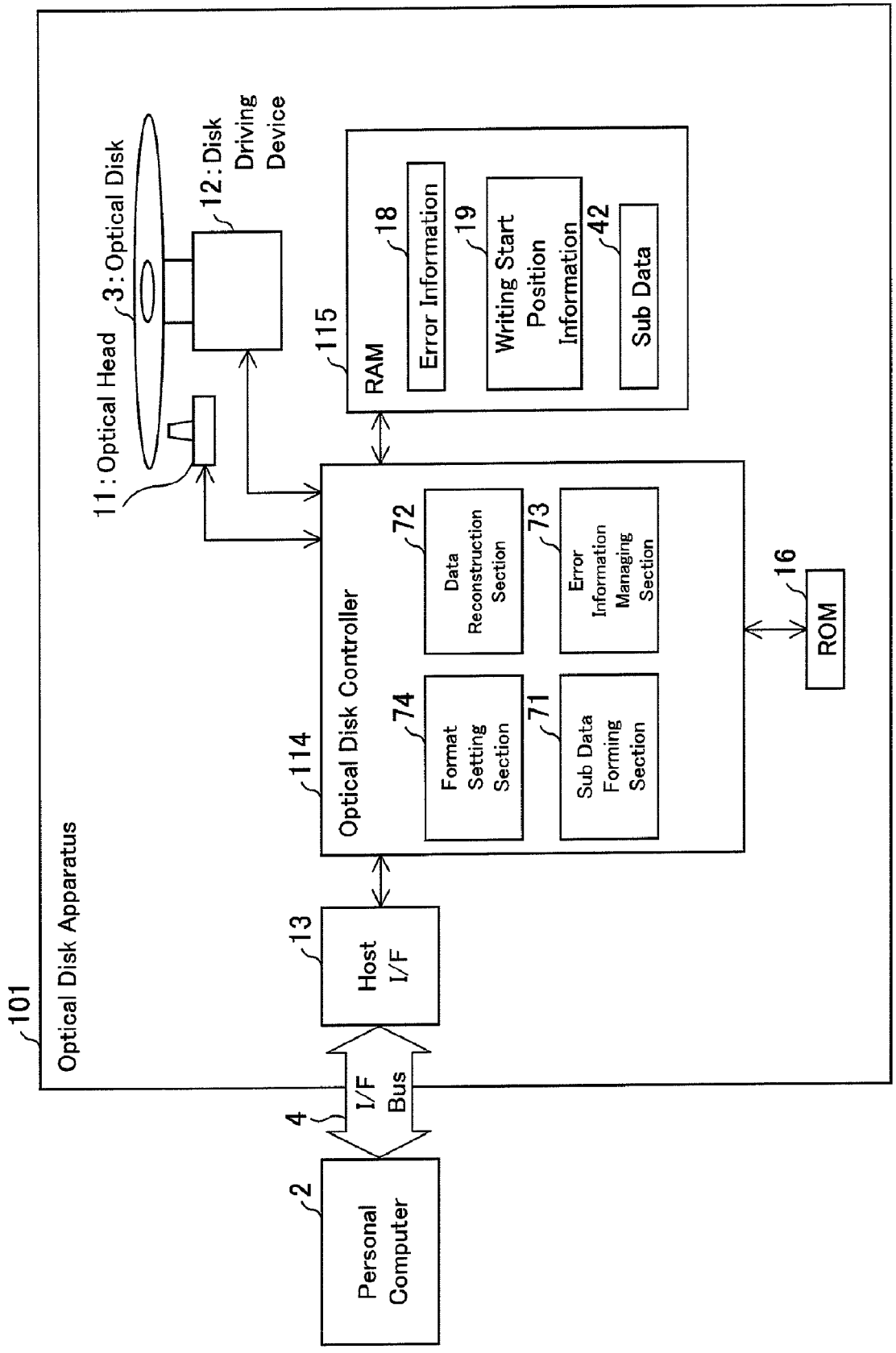
FIG. 20 illustrates an arrangement of essential parts of an optical disk apparatus in accordance with another embodiment (Embodiment 2) of the present invention.

However, such an arrangement is also possible that a format setting section 74 is provided instead of the recording position determining section 70 (see FIG. 20) so that the pieces of sub data 42 are recorded in the respective recording layers in the following manner. FIG. 20 illustrates an arrangement of essential parts of an optical disk apparatus 101 in accordance with another embodiment (Embodiment 2) of the present invention.

Initially explained is the arrangement of the optical disk apparatus 101 in accordance with Embodiment 2. As illustrated in FIG. 20, the optical disk apparatus 101 includes an optical head 11, a disk driving device 12, a host I/F 13, an optical disk controller 114, RAM 115, and ROM 16.

The optical disk apparatus 101 is different from the optical disk apparatus 1 (see FIG. 2) in that the optical disk controller 114 includes, as functional blocks, a format setting section 74 in addition to a sub-data forming section 71, a data reconstruction section 72, an error information managing section 73. Further, the optical disk apparatus 101 is different from the optical disk apparatus 1 in that recorded into the RAM 115 is writing start position information 19 in addition to error information 18 and sub data 42.

The format setting section 74 resets the assignment of the track number and the sector number in the optical disk 3. Further, the writing start position information 19 is information indicative of a writing start position set by the format setting section 74 in each recording layer.

In the optical disk apparatus 101 illustrated in FIG. 20, the same members as the members provided in the optical disk apparatus 1 illustrated in FIG. 2 have the same reference signs as those in FIG. 2, and explanations thereof are omitted.

The optical disk apparatus 101 according to Embodiment 2 is so arranged to record the sub data 42 sequentially from a position having a smaller address value set in each recording layer, i.e., in the order from a position whose track number is 0 and whose sector number is 0. That is, the position whose track number is 0 and whose sector number is 0 is set as a data writing start position in each recording layer.

Figure 21:
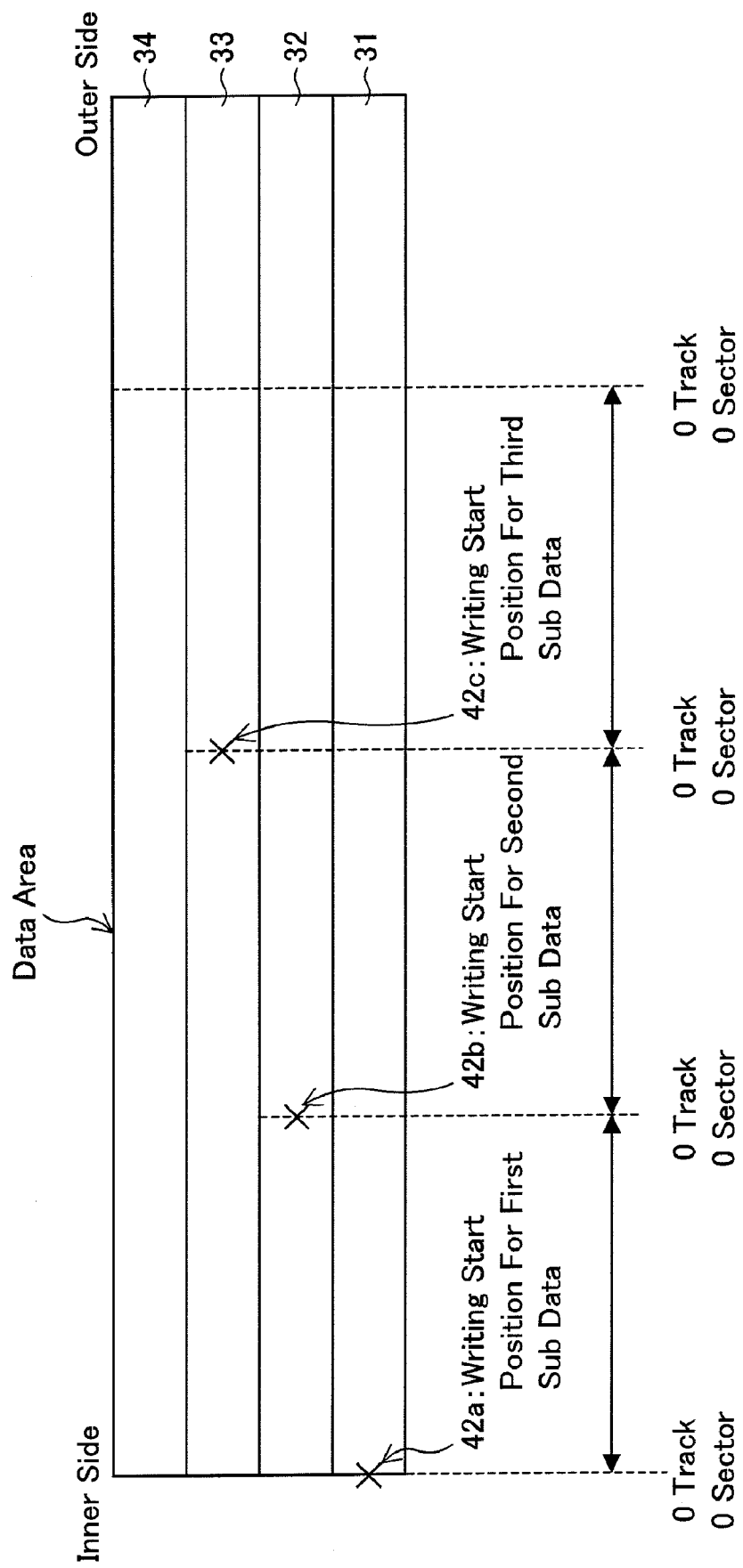
FIG. 21 illustrates an exemplary setting of a track number "0" and a sector number "0" in each recording layer in accordance with another embodiment (Embodiment 2) of the present invention.
Figure 25:
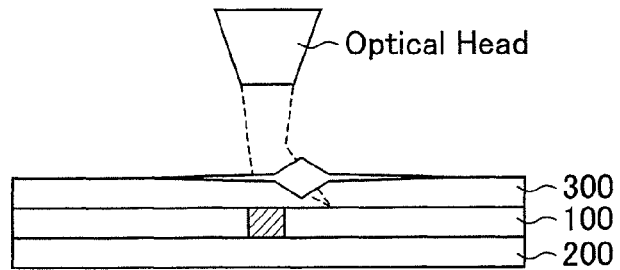
FIG. 25 illustrates a conventional technique, specifically illustrating data recorded in a recording layer and how light from an optical head is irradiated to the recording layer, in a case where a protection layer of a storage medium is damaged.
Figure 26:
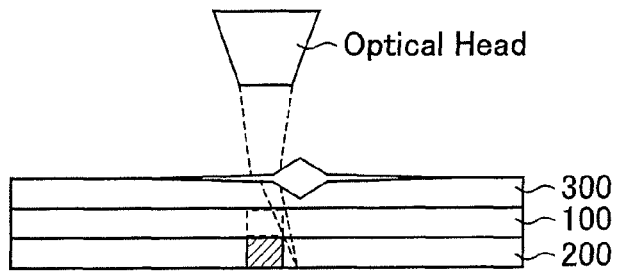
FIG. 26 illustrates a conventional technique, specifically illustrates data recorded in a recording layer and how light from an optical head is irradiated to the recording layer, in a case where a protection layer of a storage medium is damaged.
Figure 27:
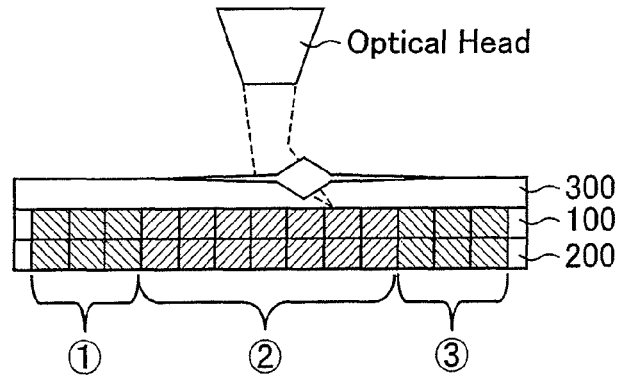
FIG. 27 illustrates a relationship between (i) how light from an optical head is irradiated to recording layers, (ii) a scratch (physical damage) formed on a protection layer, and (iii) ranges in the recording layers in which the scratch affects data writing and data reading.

As illustrated in FIG. 21, the optical disk apparatus 101 according to Embodiment 2 sets (i) an inner circumference in a first recording layer 31 of the optical disk 3 to a track number "0" and a sector number "0" of the first recording layer 31, and (ii) a position, in the second recording layer 32, shifted by a given distance from the inner circumference toward an outer circumference of the optical disk 3, to a track number "0" and a sector number "0" of the second recording layer 32. In the same manner, a position, in the third recording layer 33, which is shifted by the given distance from the position at the track number "0" and the sector number "0" in the second recording layer 32 toward the outer circumference, is set to a track number "0" and a sector number "0" in the third recording layer 33. Furthermore, a position, in the fourth recording layer 34, which is shifted by the given distance from the position at the track number "0" and the sector number "0" in the third recording layer 33 toward the outer circumference, is set to a track number "0" and a sector number "0" in the fourth recording layer 34. FIG. 21 illustrates an exemplary setting of a track number "0" and a sector number "0" in each of the recording layers in accordance with Embodiment 2 of the present invention.

The given distance is determined according to requirements for reconstruction of data 40. In a case where a scratch is at most 2 cm in size and the data 40 is to be reconstructed, for example, a distance between a recording position (writing start position) for first sub data 42a and a recording position (writing start position) for second sub data 42b, and a distance between the recording position (writing start position) for the second sub data 42b and a recording position (writing start position) for third sub data 42c should be at least 2 cm.

After the format setting section 74 sets the writing start position in each of the recording layers in a data area on the optical disk 3 appropriately, it is then determined into which recording layer each of the pieces of sub data 42 is to be recorded. Then, information (writing start position information 19) on the writing start positions determined for the pieces of sub data 42 is stored in the RAM 115. That is, the writing start position information 19 shown in FIG. 20 only indicates a physical sector number and a recording layer number of a recording position, on the optical disk 3, in which to write the first sub data 42a among the pieces of sub data 42 formed from the data block 41. In contrast, the writing start position information 19 illustrated in FIG. 21 includes (i) numbers (recording layer numbers) of recording layers in which to write the respective pieces of sub data 42 formed from the data block 41, and (ii) track numbers and sector numbers (track "0" and sector "0") each indicative of a writing start position in each of the recording layers (see FIG. 22).

When the writing start positions for the pieces of sub data 42 are determined as such, the optical disk controller 114 controls the optical head 11 and the disk driving device 12 to write each of the first sub data 42a, the second sub data 42b, and the third sub data 42c into a corresponding recording layer at a corresponding writing start position.

In a case where another pieces of sub data 42 of another data block 41, which is different from the data block 41 that has been already written into the optical disk 3 as above, is to be recorded successively, first sub data 42a, second sub data 42b, and third sub data 42c of the another data block 41 are recorded, respectively, at recording positions subsequent to those of the first sub data 42a, the second sub data 42b, and the third sub data 42c which have been already recorded.

Thus, the pieces of sub data 42 of the data blocks 41 are recorded in the successive manner as above, so that first sub data 42a, second sub data 42b, and third sub data 42c formed from the same data block 41 are always recorded in different recording layers at respective positions that are away from each other by a given distance in the projection plane of the optical disk 3.

The optical disk apparatus 101 (information processing apparatus) in accordance with Embodiment 2 may be also arranged as below. That is, the optical disk apparatus 101 in accordance with Embodiment 2 records a data block 41 by irradiating light with respect to an optical disk 3 including a plurality of recording layers (a first recording layer 31, a second recording layer 32, and a third recording layer) in which to store the data block 41. The optical disk apparatus 101 includes: a sub-data forming section 71 for forming, from a single data block 41 to be recorded, element data constituting the data block 41 and parity data (reconstruction data) for reconstructing data in a case where the element data becomes unreadable; and a format setting section 74 for carrying out setting of a track address and a sector address indicative of a writing start position for the element data or the parity data (reconstruction data) in a corresponding recording layer. Here, assuming that a direction in which the irradiated light travels is taken as a light-irradiation direction, the sub-data forming section 71 carries out, per recording layer, the setting of the track address and the sector address indicative of the writing start position for the element data or the parity data, so that the element data and the parity data are recorded at different positions in a projection plane of the optical disk 3 viewed in the light-irradiation direction.

In the above arrangement, the sub-data forming section 71 forms, from a single data block 41, element data and parity data for reconstructing the data block 41, as sub data 42. Therefore, even in a case where the element data is unreadable, it is possible to reconstruct data recorded in the optical disk 3 by use of the parity data.

Further, since the optical disk apparatus 101 includes the format setting section 74, it is possible to set addresses indicative of recording start positions for the element data and the parity data so that the element data and the parity data are recorded at different positions that do not overlap each other in the projection plane of the optical disk 3. In a case where the element data and the parity data are recorded into different recording layers at respective positions that overlap each other in the projection plane, there may occur a problem that both of the element data and the parity data become unreadable due to a scratch formed on the optical disk 3a. However, the above arrangement makes it possible to prevent such a problem. With the arrangement, it is possible to improve reliability of reconstruction of a data block 41 recorded in the optical disk 3 in a case where data loss occurs in the recorded data block 41.

As described above, the information processing apparatus according to the present invention has the following arrangement. Further, it can be said that an information processing apparatus control method according to the present invention includes the following steps.

As described above, an information processing apparatus of the present invention is an information processing apparatus for recording data into an optical disk including a plurality of recording layers in which to record data, by irradiating light thereto. The information processing apparatus of the present invention includes: forming means for forming, from a single piece of data to be recorded, element data constituting the single piece of data and reconstruction data for reconstructing the single piece of data in a case where the element data becomes unreadable; and recording position determining means for determining respective recording positions for the element data and the reconstruction data, which are formed by the forming means from the single piece of data, so that the element data and the reconstruction data are recorded at the respective recording positions in different recording layers. The recording position determining means determines the respective recording positions for the element data and the reconstruction data such that the respective recording positions do not overlap each other in a projection plane of the optical disk viewed in a light-irradiation direction in which the irradiated light travels.

The above arrangement allows the information processing apparatus according to the present invention to advantageously improve reliability of data reconstruction in a case where data loss occurs in recorded data in an optical disk in which data is recordable in a plurality of layers.

Further, in addition to the above arrangement, the information processing apparatus according to the present invention may be arranged such that: each of the recording positions for data is managed according to a track and a sector in each of the plurality of recording layers; addresses are assigned to tracks in a corresponding manner in the plurality of recording layers and addresses are assigned to sectors in a corresponding manner in the plurality of recording layers; and the recording position determining means determines the respective recording positions for the element data and the reconstruction data, which recording positions do not overlap each other in the projection plane, so that the element data and the reconstruction data are recorded into respective tracks or sectors of different addresses in the different recording layers.

Further, in addition to the above arrangement, the information processing apparatus according to the present invention may be arranged such that: the recording position determining means specifies the number of sectors or tracks for an interval between the respective recording positions for the element data and the reconstruction data in the projection plane so that the element data and the reconstruction data are recorded into the respective tracks or sectors of different addresses in the different recording layers.

With the above arrangement, since addresses are assigned to tracks in a corresponding manner in the plurality of recording layers and addresses are assigned to sectors in a corresponding manner in the plurality of recording layers, it is possible to use common track numbers and common sector numbers to specify a recording position in each of the plurality of recording layers.

Further, the recording position determining means can determine, by specifying a track or sector, each of the recording positions for the element data and the reconstruction data so that the recording positions do not overlap each other in the projection plane. Therefore, it is possible to easily determine the recording positions for the element data and the reconstruction data.

Furthermore, in addition to the above arrangement, the information processing apparatus according to the present invention may be arranged such that: the forming means forms, from the single piece of data to be recorded, the element data, which includes pieces of element data, and the reconstruction data, which is capable of reconstructing the single piece of data from readable pieces of element data among the pieces of element data in a case where any one of the pieces of element data becomes unreadable; an allowable size of a scratch to be formed on a recording surface of the optical disk, which is a surface that receives the irradiated light for recording the single piece of data therein, is set within a range in which the single piece of data is reconstructible; and the recording position determining means determines recording positions for the pieces of element data and the reconstruction data by specifying (a) the number of sectors or tracks for an interval between the recording positions for the pieces of element data and (b) the number of sectors or tracks for an interval between the recording positions for a respective of the pieces of element data and the reconstruction data so that the recording positions for the pieces of element data and the reconstruction data are distanced from each other in the projection plane by at least the allowable size of the scratch thus set.

With the above arrangement, the recording position determining means can specify the number of sectors or tracks for an interval between the recording positions for the pieces of element data and the number of sectors or tracks for an interval between the recording positions for a respective of the pieces of element data and the reconstruction data so that the recording positions are distanced from each other by at least the allowable size of the scratch thus set. As a result, in a case where the size of the scratch formed on the recording surface is within the range in which data reconstruction can be carried out, target data can be reconstructed from a piece of element data that is not affected by the scratch and the reconstruction data or only from the pieces of element data.

Further, in addition to the above arrangement, the information processing apparatus according to the present invention may be arranged such that: the recording position determining means changes the number of sectors specified for (a) the interval between the recording positions for the pieces of element data and (b) the interval between the recording positions for a respective of the pieces of element data and the reconstruction data, depending on a distance, in the projection plane, from a center of the optical disk to a respective of tracks in which to record the pieces of element data and the reconstruction data.

A length of a track in the vicinity of the center of the optical disk is different from that of a track in the vicinity of a circumference of the optical disk. Here, it is assumed that the pieces of element data and the reconstruction data are recorded away from each other by a given number of sectors. In such a case, a distance between the pieces of element data or a distance between a respective of the pieces of element data and the reconstruction data becomes shorter in a case where they are recorded in the track in the vicinity of the center of the optical disk than in a case where they are recorded in the track in the vicinity of the circumference of the optical disk.

However, with the above arrangement, depending on distances from the center of the optical disk to the tracks in which to record the pieces of element data and the reconstruction data, the number of sectors for the interval between the pieces of element data or the interval between the respective of the pieces of element data and the reconstruction data can be changed. This makes it possible to determine appropriate recording positions for the element data and the reconstruction data by specifying the number of sectors in each of the recording layers of the optical disk.

In addition to the above arrangement, the information processing apparatus according to the present invention may be arranged such that: the forming means forms, from the single piece of data to be recorded, the element data, which includes a plurality of pieces of element data into which the single piece of data is broken, and the reconstruction data, which includes parity information obtained from the plurality of pieces of element data.

In addition to the above arrangement, the information processing apparatus according to the present invention may be arranged such that: the forming means forms, from the single piece of data to be recorded, the element data, which is the single piece of data itself, and the reconstruction data, which is a copy of the single piece of data.

As described above, an information processing apparatus control method according to the present invention is a control method for controlling an information processing apparatus for recording data into an optical disk including a plurality of recording layers in which to record data, by irradiating light thereto. The control method includes the steps of (i) forming, from a single piece of data to be recorded, element data constituting the single piece of data and reconstruction data for reconstructing the single piece of data in a case where the element data becomes unreadable; and (ii) determining respective recording positions for the element data and the reconstruction data, which are formed from the single piece of data in the step (i), so that the element data and the reconstruction data are recorded at the respective recording positions in different recording layers, and the step (ii) determines the respective recording positions for the element data and the reconstruction data such that the respective recording positions do not overlap each other in a projection plane of the optical disk viewed in a light-irradiation direction in which the irradiated light travels.

With the above arrangement, the information processing apparatus control method according to the present invention can yield an effect of improving reliability of data reconstruction in a case where data loss occurs in data recorded in an optical disk in which data is recordable in a plurality of layers.

As described above, an information processing apparatus according to the present invention is an information processing apparatus for recoding data into an optical disk including a plurality of recording layers in which to record data, by irradiating light thereto. The information processing apparatus includes: forming means for forming, from a single piece of data to be recorded, element data constituting the single piece of data and reconstruction data for reconstructing the single piece of data in a case where the element data becomes unreadable; and address setting means for setting a track address and a sector address of a writing start position of the element data or the reconstruction data in each of the plurality of recording layer, and the address setting means sets, per recording layer, the track address and the sector address of the writing start position of the element data or the reconstruction data so that the respective recording positions do not overlap each other in a projection plane of the optical disk viewed in a light-irradiation direction in which the irradiated light travels.

As a result, the information processing apparatus according to the present invention can yield an effect that reliability of data reconstruction in a case where data loss occurs in data recorded in an optical disk in which data is recordable into a plurality of layers.

The information processing apparatus of the present invention may be realized by a computer. In this case, the scope of the present invention also includes (i) an information processing apparatus control program that realizes the information processing apparatus as a computer by causing the computer to function as each means of the information processing apparatus and (ii) a computer readable storage medium in which the control program is stored.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

In a case where a piece of data is recorded into an optical disk including a plurality of recording layers, the information processing apparatus according to the present invention can record pieces of sub data, which are formed from the piece of data, at different recording positions in the optical disk in a project plane of the optical disk. This makes it possible to reconstruct the piece of data even in a case where any one of the pieces of sub data recorded into the plurality of recording layers of the optical disk is lost. This is because even in such a case, the other pieces of sub data are not damaged or lost, and therefore the recorded data can be reconstructed form the other pieces of sub data. As a result, the present invention can be widely applied to an optical disk recording device that is required to reconstruct data even in a case where an optical disk is damaged.

The invention claimed is:
1. An information processing apparatus for recording data into an optical disk including a plurality of recording layers in which to record data, by irradiating light thereto, said information processing apparatus comprising:
forming means for forming, from a single piece of data to be recorded, element data constituting the single piece of data and reconstruction data for reconstructing the single piece of data in a case where the element data becomes unreadable; and
recording position determining means for determining respective recording positions for the element data and the reconstruction data, which are formed by the forming means from the single piece of data, so that the element data and the reconstruction data are recorded at the respective recording positions in different recording layers,
the recording position determining means determining the respective recording positions for the element data and the reconstruction data such that the respective recording positions do not overlap each other in a projection plane of the optical disk viewed in a light-irradiation direction in which the irradiated light travels.

2. The information processing apparatus as set forth in claim 1, wherein:
each of the recording positions for data is managed according to a track and a sector in each of the plurality of recording layers;
addresses are assigned to tracks in a corresponding manner in the plurality of recording layers and addresses are assigned to sectors in a corresponding manner in the plurality of recording layers; and
the recording position determining means determines the respective recording positions for the element data and the reconstruction data, which recording positions do not overlap each other in the projection plane, so that the element data and the reconstruction data are recorded into respective tracks or sectors of different addresses in the different recording layers.

3. The information processing apparatus as set forth in claim 2, wherein:
the recording position determining means specifies the number of sectors or tracks for an interval between the respective recording positions for the element data and the reconstruction data in the projection plane so that the element data and the reconstruction data are recorded into the respective tracks or sectors of different addresses in the different recording layers.

4. The information processing apparatus as set forth in claim 3, wherein:
the forming means forms, from the single piece of data to be recorded, the element data, which includes pieces of element data, and the reconstruction data, which is capable of reconstructing the single piece of data from readable pieces of element data among the pieces of element data in a case where any one of the pieces of element data becomes unreadable;
an allowable size of a scratch to be formed on a recording surface of the optical disk, which is a surface that receives the irradiated light for recording the single piece of data therein, is set within a range in which the single piece of data is reconstructible; and
the recording position determining means determines recording positions for the pieces of element data and the reconstruction data by specifying (a) the number of sectors or tracks for an interval between the recording positions for the pieces of element data and (b) the number of sectors or tracks for an interval between the recording positions for a respective of the pieces of element data and the reconstruction data so that the recording positions for the pieces of element data and the reconstruction data are distanced from each other in the projection plane by at least the allowable size of the scratch thus set.

5. The information processing apparatus as set forth in claim 4, wherein:
the recording position determining means changes the number of sectors specified for (a) the interval between the recording positions for the pieces of element data and (b) the interval between the recording positions for a respective of the pieces of element data and the reconstruction data, depending on a distance, in the projection plane, from a center of the optical disk to a respective of tracks in which to record the pieces of element data and the reconstruction data.

6. The information processing apparatus as set forth in claim 1, wherein:
the forming means forms, from the single piece of data to be recorded, the element data, which includes a plurality of pieces of element data into which the single piece of data is broken, and the reconstruction data, which includes parity information obtained from the plurality of pieces of element data.

7. The information processing apparatus as set forth in claim 1, wherein:
the forming means forms, from the single piece of data to be recorded, the element data, which is the single piece of data itself, and the reconstruction data, which is a copy of the single piece of data.

8. A control method for controlling an information processing apparatus for recording data into an optical disk including a plurality of recording layers in which to record data, by irradiating light thereto, said method comprising the steps of:
(i) forming, from a single piece of data to be recorded, element data constituting the single piece of data and reconstruction data for reconstructing the single piece of data in a case where the element data becomes unreadable; and
(ii) determining respective recording positions for the element data and the reconstruction data, which are formed from the single piece of data in the step (i), so that the element data and the reconstruction data are recorded at the respective recording positions in different recording layers,
the step (ii) determining the respective recording positions for the element data and the reconstruction data such that the respective recording positions do not overlap each other in a projection plane of the optical disk viewed in a light-irradiation direction in which the irradiated light travels.

9. A non-transitory computer-readable storage medium storing an information processing apparatus control program, which when executed by a computer performs the function of each means of an information processing apparatus as set forth in claim 1.

10. The information processing apparatus as set forth in claim 2, wherein:
the forming means forms, from the single piece of data to be recorded, the element data, which includes a plurality of pieces of element data into which the single piece of data is broken, and the reconstruction data, which includes parity information obtained from the plurality of pieces of element data.

11. The information processing apparatus as set forth in claim 3, wherein:
the forming means forms, from the single piece of data to be recorded, the element data, which includes a plurality of pieces of element data into which the single piece of data is broken, and the reconstruction data, which includes parity information obtained from the plurality of pieces of element data.

12. The information processing apparatus as set forth in claim 4, wherein:
the forming means forms, from the single piece of data to be recorded, the element data, which includes a plurality of pieces of element data into which the single piece of data is broken, and the reconstruction data, which includes parity information obtained from the plurality of pieces of element data.

13. The information processing apparatus as set forth in claim 5, wherein:
the forming means forms, from the single piece of data to be recorded, the element data, which includes a plurality of pieces of element data into which the single piece of data is broken, and the reconstruction data, which includes parity information obtained from the plurality of pieces of element data.

14. The information processing apparatus as set forth in claim 2, wherein:
the forming means forms, from the single piece of data to be recorded, the element data, which is the single piece of data itself, and the reconstruction data, which is a copy of the single piece of data.

15. The information processing apparatus as set forth in claim 3, wherein:
the forming means forms, from the single piece of data to be recorded, the element data, which is the single piece of data itself, and the reconstruction data, which is a copy of the single piece of data.

16. The information processing apparatus as set forth in claim 4, wherein:
the forming means forms, from the single piece of data to be recorded, the element data, which is the single piece of data itself, and the reconstruction data, which is a copy of the single piece of data.

17. The information processing apparatus as set forth in claim 5, wherein:
the forming means forms, from the single piece of data to be recorded, the element data, which is the single piece of data itself, and the reconstruction data, which is a copy of the single piece of data.

18. A non-transitory computer readable storage medium storing an information processing apparatus control program, which when executed causes a computer to perform the function of each means of an information processing apparatus as set forth in claim 2.

19. A non-transitory computer readable storage medium storing an information processing apparatus control program, which when executed causes a computer to perform the function of each means of an information processing apparatus as set forth in claim 3.

* * * * *